(12) United States Patent
Okutani et al.

(10) Patent No.: US 10,834,477 B2
(45) Date of Patent: Nov. 10, 2020

(54) INFORMATION PROCESSING APPARATUS AND CONTROL METHOD THEREOF

(71) Applicant: CANON KABUSHIKI KAISHA, Tokyo (JP)

(72) Inventors: Yasuo Okutani, Kawasaki (JP); Hajime Kawanishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/359,332

(22) Filed: Mar. 20, 2019

(65) Prior Publication Data
US 2019/0297393 A1 Sep. 26, 2019

(30) Foreign Application Priority Data
Mar. 23, 2018 (JP) ................................. 2018-056748

(51) Int. Cl.
*H04N 21/845* (2011.01)
*H04N 7/18* (2006.01)
(Continued)

(52) U.S. Cl.
CPC ....... *H04N 21/8456* (2013.01); *A63F 13/355* (2014.09); *A63F 13/52* (2014.09);
(Continued)

(58) Field of Classification Search
CPC .......... H04N 21/8456; H04N 21/2187; H04N 7/181; G06T 7/73; G06T 7/97; A63F 13/355; A63F 13/52; A63F 2300/6615
See application file for complete search history.

(56) References Cited

U.S. PATENT DOCUMENTS 5,629,740 A * 5/1997 Tanaka ................. G11B 27/031
                                                 348/419.1
6,020,931 A * 2/2000 Bilbrey ................. H04N 5/222
                                                   348/584
(Continued)

FOREIGN PATENT DOCUMENTS

EP       0921678 A1   6/1999
JP    2006310936 A   11/2006
(Continued)

OTHER PUBLICATIONS

Extended European Search Report dated Nov. 4, 2019 by the European Patent Office in corresponding European Patent Application No. 19161494.0.

*Primary Examiner* — David E Harvey
(74) *Attorney, Agent, or Firm* — Carter, DeLuca & Farrell LLP

(57) ABSTRACT

An information processing apparatus configured to communicate with an image generating apparatus that generates a virtual viewpoint image that is based on a plurality of images acquired by image capturing with a plurality of cameras from a plurality of directions, comprises a transmission unit which transmits an inquiry to the image generating apparatus that is obtaining a data set for generating a virtual viewpoint image, an obtaining unit which obtains time information regarding a time corresponding to a virtual viewpoint image that can be generated by the image generating apparatus, based on a response to the inquiry transmitted by the transmission unit, and an output unit which outputs, to the image generating apparatus, a generation instruction to generate a virtual viewpoint image corresponding to a time determined based on the time information obtained by the obtaining unit.

17 Claims, 15 Drawing Sheets

(51) Int. Cl.
*H04N 21/2187* (2011.01)
*G06T 7/73* (2017.01)
*G06T 7/00* (2017.01)
*A63F 13/355* (2014.01)
*A63F 13/52* (2014.01)

(52) U.S. Cl.
CPC ................. *G06T 7/73* (2017.01); *G06T 7/97* (2017.01); *H04N 7/181* (2013.01); *H04N 21/2187* (2013.01); *A63F 2300/6615* (2013.01)

(56) References Cited

U.S. PATENT DOCUMENTS

| | | | | |
|---|---|---|---|---|
| 6,490,001 | B1* | 12/2002 | Shintani | H04N 5/211 348/554 |
| 6,556,722 | B1* | 4/2003 | Russell | G01S 5/16 348/94 |
| 8,977,492 | B1* | 3/2015 | Rosser | G01C 21/20 701/467 |
| 9,569,812 | B1* | 2/2017 | Kopf | G06T 15/20 |
| 9,998,664 | B1* | 6/2018 | Long | G06T 3/005 |
| 10,080,061 | B1* | 9/2018 | Kirley | H04N 21/43637 |
| 2003/0076413 | A1* | 4/2003 | Kanade | H04N 5/2627 348/139 |
| 2004/0131337 | A1* | 7/2004 | Ono | G11B 20/10527 386/264 |
| 2008/0005323 | A1* | 1/2008 | Shinkai | G11B 27/329 709/224 |
| 2008/0083002 | A1* | 4/2008 | Yamaguchi | H04N 5/772 725/61 |
| 2011/0116759 | A1* | 5/2011 | Oikawa | H04N 9/8042 386/226 |
| 2012/0233631 | A1* | 9/2012 | Geshwind | H04N 21/2547 725/1 |
| 2013/0028523 | A1* | 1/2013 | Yokoyama | G06T 11/60 382/199 |
| 2013/0215229 | A1* | 8/2013 | Yerli | G06T 13/20 348/46 |
| 2013/0297353 | A1* | 11/2013 | Strange | G06K 9/00449 705/4 |
| 2014/0160233 | A1* | 6/2014 | Ishida | H04N 5/2628 348/36 |
| 2014/0165097 | A1* | 6/2014 | Chase | H04N 21/23424 725/36 |
| 2014/0232818 | A1* | 8/2014 | Carr | H04N 5/222 348/36 |
| 2015/0032801 | A1* | 1/2015 | Hart | H04W 4/12 709/203 |
| 2015/0035852 | A1* | 2/2015 | Yang | G09G 5/02 345/603 |
| 2015/0317838 | A1* | 11/2015 | Foxlin | G02B 27/0093 345/633 |
| 2016/0034754 | A1* | 2/2016 | Chan | G06K 9/3258 345/619 |
| 2016/0316110 | A1* | 10/2016 | Ross | H04L 7/10 |
| 2017/0157512 | A1* | 6/2017 | Long | A63F 13/86 |
| 2017/0238055 | A1 | 8/2017 | Chang et al. | |
| 2018/0167659 | A1* | 6/2018 | Pulitzer | G16H 50/30 |
| 2018/0275861 | A1* | 9/2018 | Mate | G06F 3/165 |
| 2018/0352018 | A1* | 12/2018 | Mate | H04L 65/601 |
| 2019/0196686 | A1* | 6/2019 | Stulken | G06F 3/0488 |
| 2019/0394275 | A1* | 12/2019 | Crawford | H04L 67/1097 |
| 2020/0029065 | A1* | 1/2020 | Aizawa | H04N 13/282 |
| 2020/0051582 | A1* | 2/2020 | Gilson | G10L 15/02 |

FOREIGN PATENT DOCUMENTS

| | | |
|---|---|---|
| JP | 2015212876 A | 11/2015 |
| WO | 2017204173 A1 | 11/2017 |

* cited by examiner

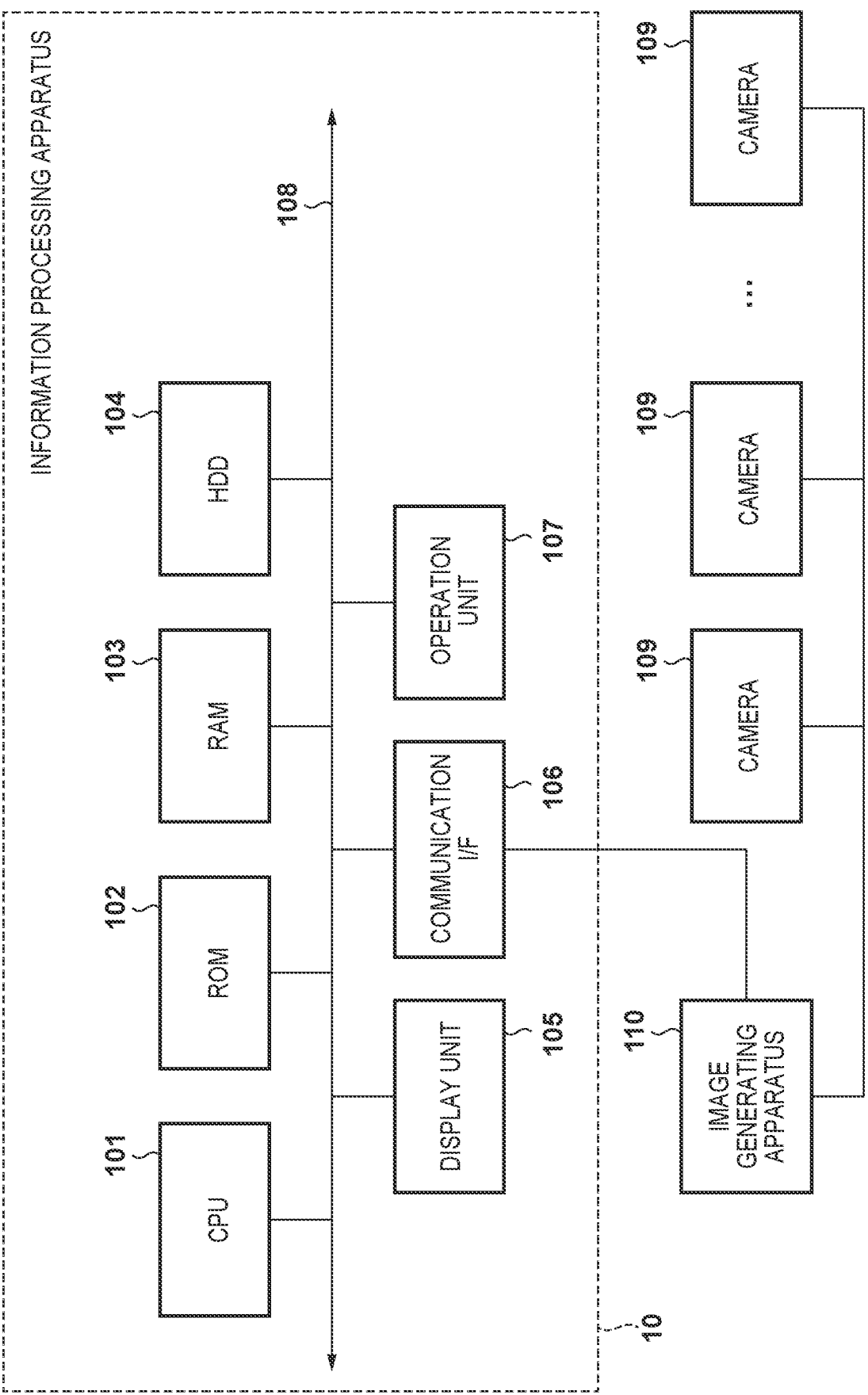

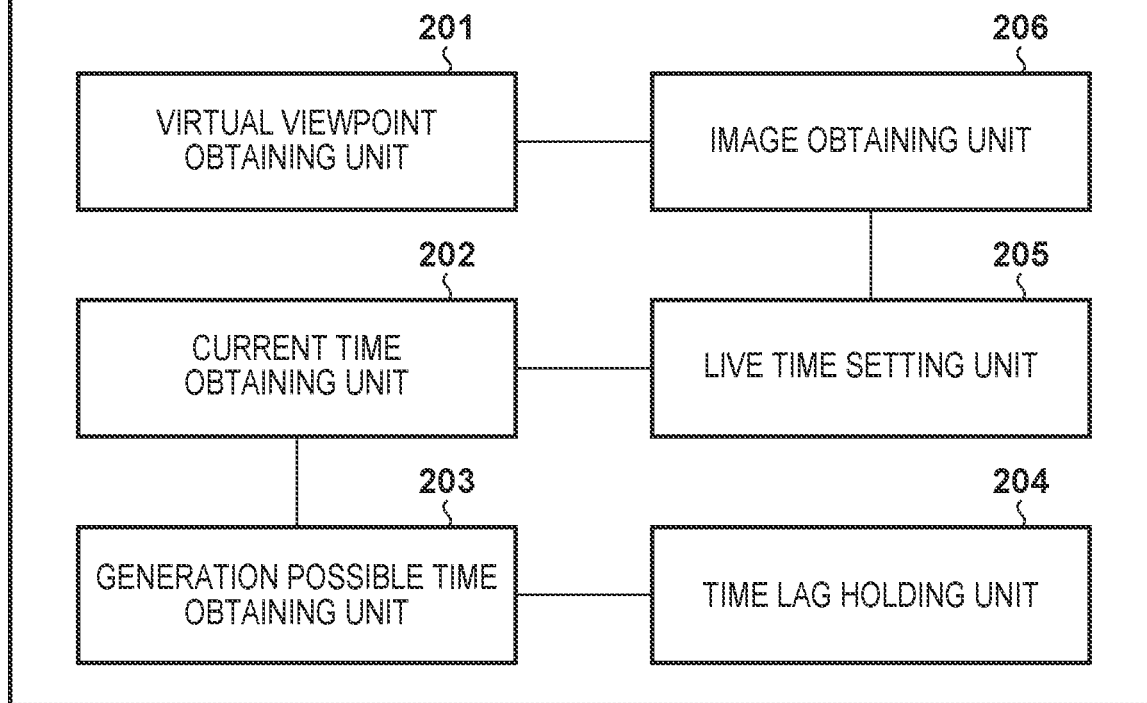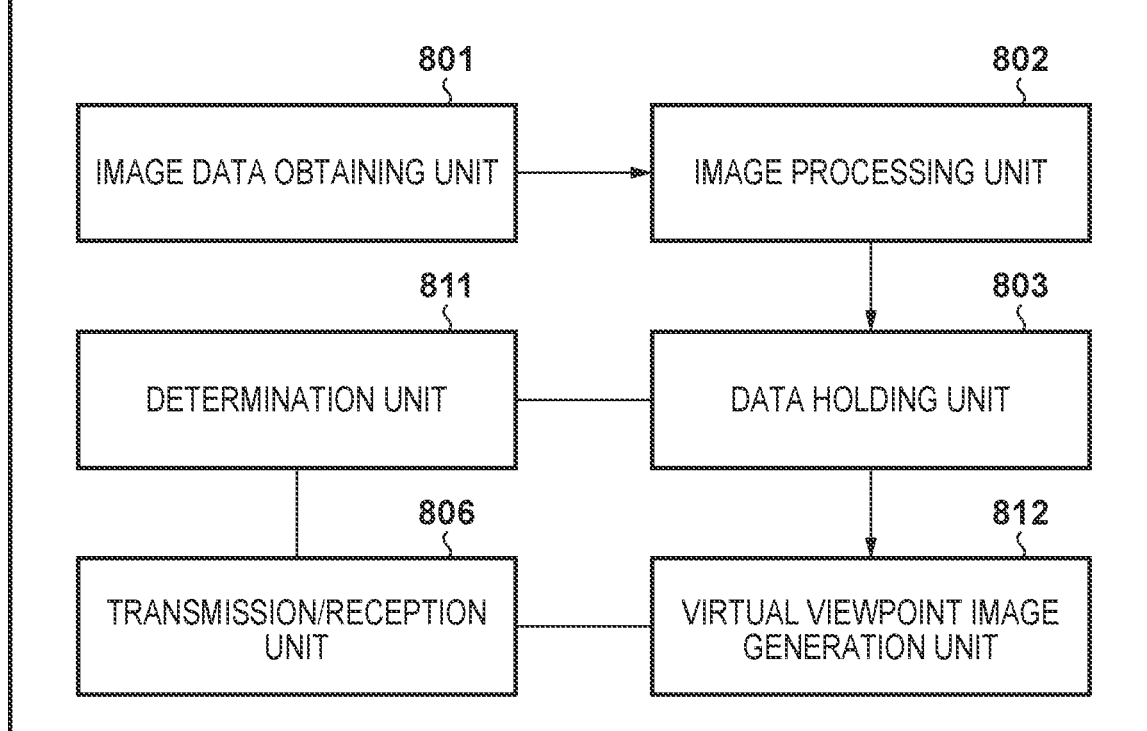

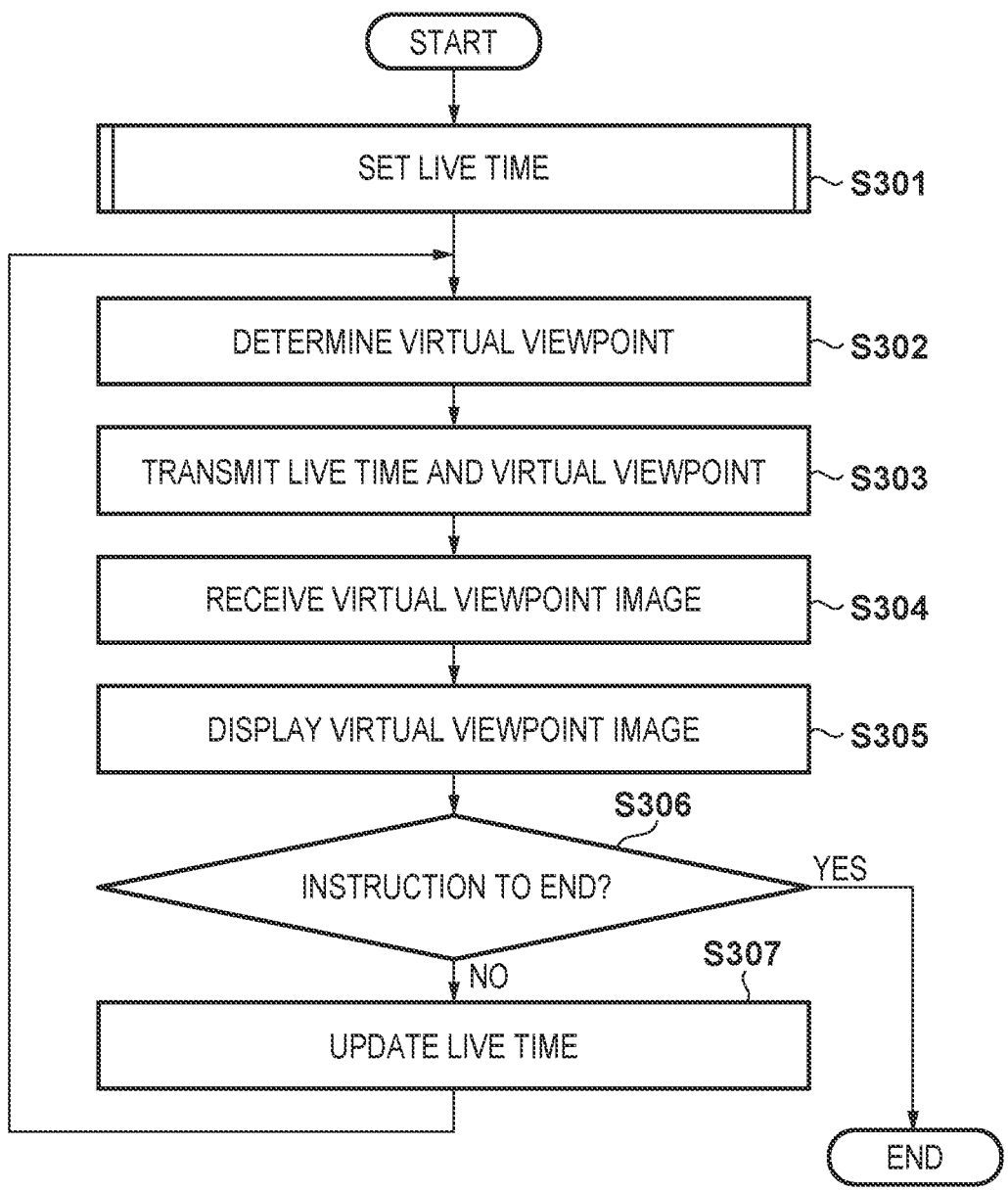

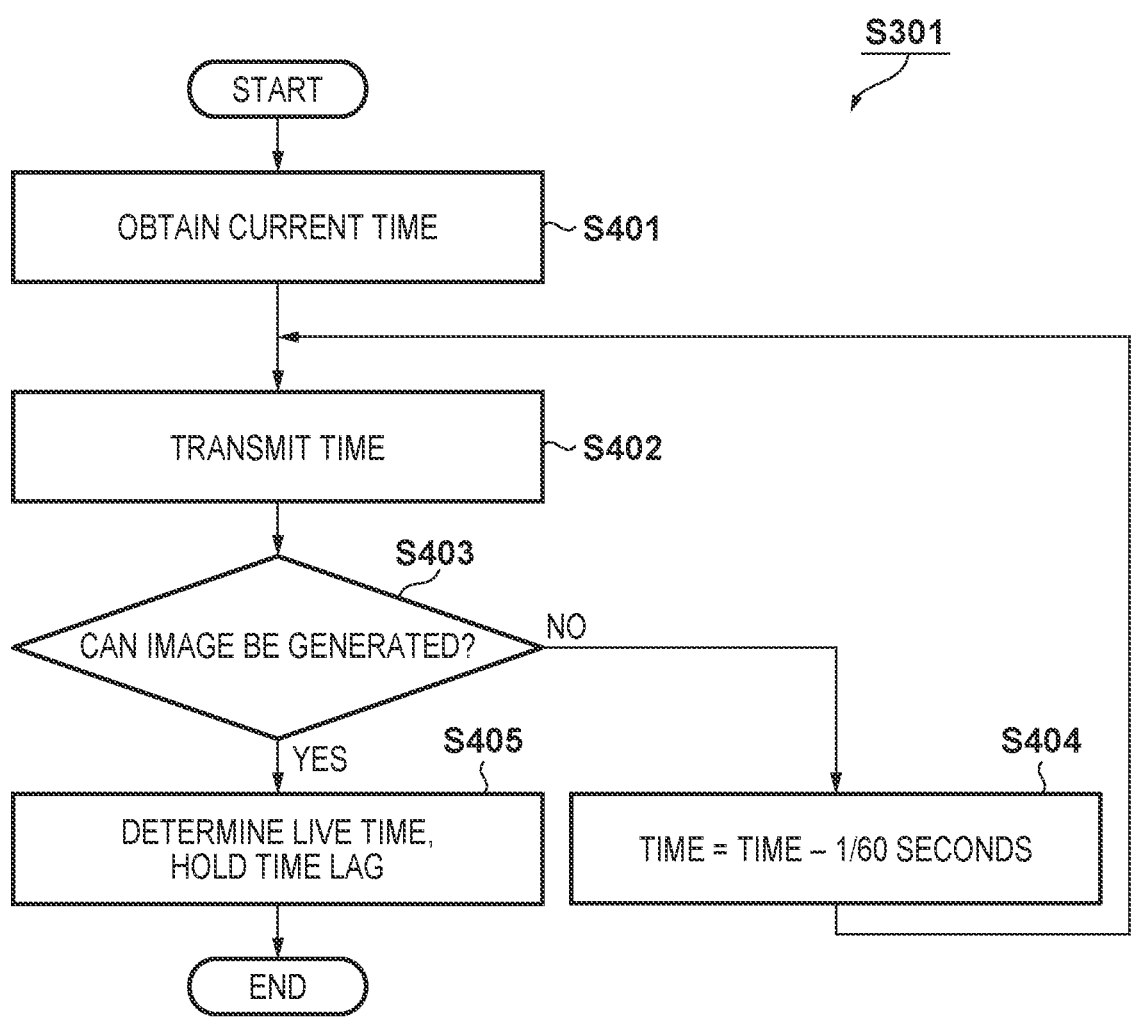

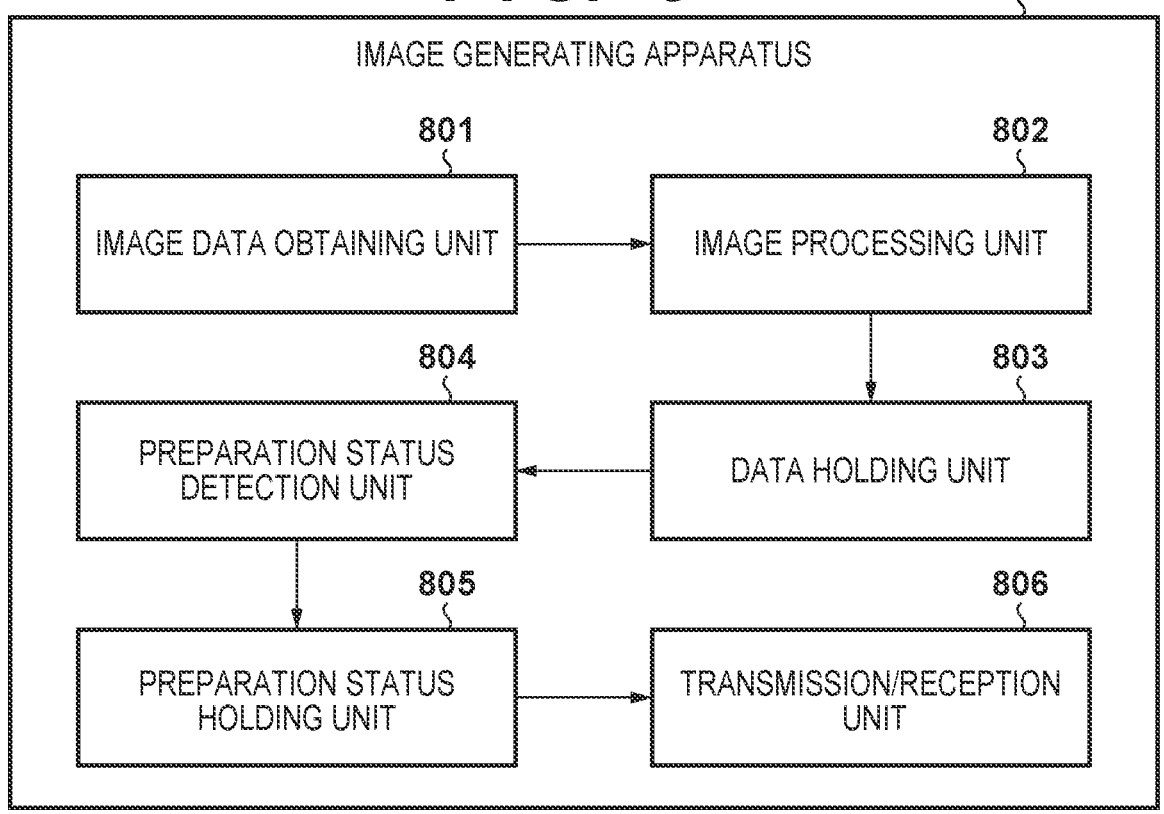

■ CASE OF TEXT INPUT IN FORM

■ SETTING TIME USING SLIDER (GUI)

■ SETTING TIME USING DIAL (PHYSICAL DEVICE)

F I G. 12A 1201

```
{\n
    "inquiry" : ["available time" , "00:33:21:45"], \n
} \n\n
```

F I G. 12B 1202

```
{\n
    "available time" : "OK", \n
} \n\n
```

F I G. 12C 1203

```
{\n
    "available time" : "FAIL", \n
} \n\n
```

FIG. 15A 1501

```
{\n
    "point of view" : [123, 0, 2.5, ...], \n
    "angle" : 50.0, \n
    "time code" : "LIVE", \n
} \n\n
```

FIG. 15B 1502

```
{\n
    "point of view" : [123, 0, 2.5, ...], \n
    "angle" : 50.0, \n
    "time code" : "00:33:21:45", \n
} \n\n
```

INFORMATION PROCESSING APPARATUS AND CONTROL METHOD THEREOF

BACKGROUND OF THE INVENTION

Field of the Invention

The present invention relates to a technique for generating a virtual viewpoint image that is based on a virtual viewpoint.

Description of the Related Art

In recent years, attention has been given to a technique for arranging a plurality of cameras at different positions, performing shooting from multiple viewpoints in synchronization, and generating a virtual viewpoint image from a virtual viewpoint using images from multiple viewpoints acquired through the shooting. Generation and viewing of a virtual viewpoint image that is based on images from multiple viewpoints can be realized by collecting images shot with a plurality of cameras in an image processing unit such as server, generating a virtual viewpoint image by the image processing unit performing processing such as rendering that is based on a virtual viewpoint, and displaying the generated image on a user terminal. In services in which a virtual viewpoint image is used, for example, a video creator uses video images of a soccer or basketball game to create impressive content from a virtual viewpoint. In addition, a user who is viewing the content can watch the game while freely changing the virtual viewpoint, for example. Accordingly, it is possible to give the user a more realistic sensation, compared with observation of an ordinary shot image.

Japanese Patent Laid-Open No. 2006-310936 discloses a technique for temporarily accumulating captured image data, delaying the data, and then generating a virtual viewpoint image.

In the case of generating a virtual viewpoint image by performing image processing on images shot in synchronization with a plurality of cameras, the preparation time that is required from shooting until a state where a virtual viewpoint image can be generated is not short. Thus, in the case of reproducing a virtual viewpoint image, it is desirable that the influence of this preparation time is taken into consideration. In other words, it is desirable that this preparation time is taken in consideration when determining the time code of a virtual viewpoint image that is generated. If the time code of the virtual viewpoint image is determined with plenty of leeway for the preparation time, the virtual viewpoint image is generated successfully, but there is a longer time lag from the images that are being shot with the group of cameras. On the other hand, if the preparation time is set too short, there is a possibility that the generation of a virtual viewpoint image will not be completed on time. Accordingly, if the time required for generating a virtual viewpoint image can be known, there is an advantage that an appropriate time code can be set, for example.

In Japanese Patent Laid-Open No. 2006-310936, shot data is accumulated temporarily and delayed, and a virtual viewpoint image can be then generated. However, in Japanese Patent Laid-Open No. 2006-310936, a specific method for designating a delay time is not mentioned at all, and there is no mention whatsoever of a method for obtaining a preparation time required to enter a state where a virtual viewpoint image can be generated in a live broadcast.

SUMMARY OF THE INVENTION

One aspect of the present invention provides an information processing apparatus that can be aware of a time required for generating a virtual viewpoint image.

According to one aspect of the present invention, there is provided an information processing apparatus configured to communicate with an image generating apparatus that generates a virtual viewpoint image that is based on a plurality of images acquired by image capturing with a plurality of cameras from a plurality of directions, the information processing apparatus comprising: a transmission unit configured to transmit an inquiry to the image generating apparatus that is obtaining a data set for generating a virtual viewpoint image; an obtaining unit configured to obtain time information regarding a time corresponding to a virtual viewpoint image that can be generated by the image generating apparatus, based on a response to the inquiry transmitted by the transmission unit; and an output unit configured to output, to the image generating apparatus, a generation instruction to generate a virtual viewpoint image corresponding to a time determined based on the time information obtained by the obtaining unit.

According to another aspect of the present invention, there is provided a control method of an information processing apparatus configured to communicate with an image generating apparatus that generates a virtual viewpoint image that is based on a plurality of images acquired by image capturing with a plurality of cameras from a plurality of directions, the method comprising: transmitting an inquiry to the image generating apparatus that is obtaining a data set for generating a virtual viewpoint image; obtaining time information regarding a time corresponding to a virtual viewpoint image that can be generated by the image generating apparatus, based on a response to the transmitted inquiry; and outputting, to the image generating apparatus, an instruction to generate a virtual viewpoint image corresponding to a time determined based on the obtained time information.

According to another aspect of the present invention, there is provided a non-transitory computer-readable storage medium that stores a program for causing a computer that communicates with an image generating apparatus, which generates a virtual viewpoint image that is based on a plurality of images acquired by image capturing with a plurality of cameras from a plurality of directions, to execute a control method comprising: transmitting an inquiry to the image generating apparatus that is obtaining a data set for generating a virtual viewpoint image; obtaining time information regarding a time corresponding to a virtual viewpoint image that can be generated by the image generating apparatus, based on a response to the transmitted inquiry; and outputting, to the image generating apparatus, an instruction to generate a virtual viewpoint image corresponding to a time determined based on the obtained time information.

Further features of the present invention will become apparent from the following description of exemplary embodiments with reference to the attached drawings.

BRIEF DESCRIPTION OF THE DRAWINGS

FIG. 1 is a block diagram showing an example of the hardware configuration of an information processing apparatus in a first embodiment.

FIG. 2A is a block diagram showing an example of the function configuration of the information processing apparatus in the first embodiment.

FIG. 2B is a block diagram showing an example of the function configuration of an image generating apparatus in the first embodiment.

FIG. 3 is a flowchart showing processing of the information processing apparatus in the first embodiment.

FIG. 4 is a flowchart showing processing for setting a live time in the first embodiment.

FIG. 8 is a block diagram showing an example of the function configuration of the image generating apparatus in the second embodiment.

FIGS. 12A to 12C are schematic diagrams of an example of a transmission/reception message in the third embodiment.

FIGS. 15A and 15B are schematic diagrams showing an example of a transmission/reception message in the fourth embodiment.

DESCRIPTION OF THE EMBODIMENTS

Figure 5A:
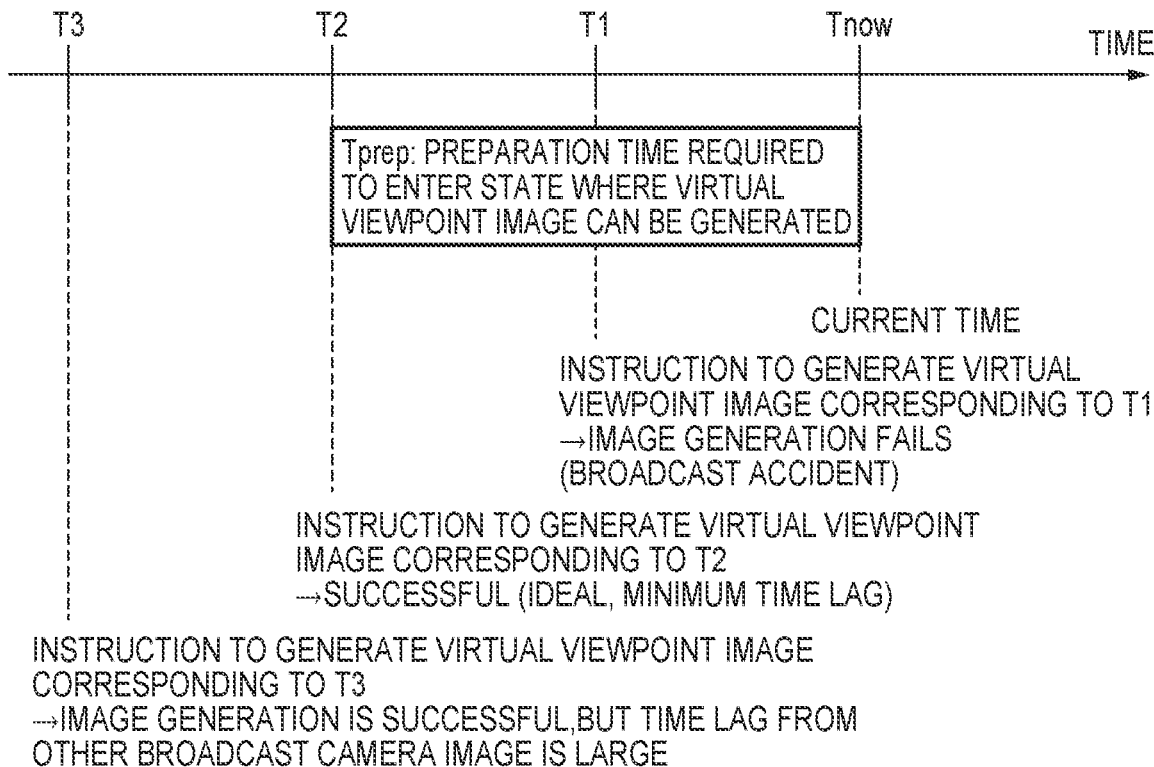
FIGS. 5A and 5B are schematic diagrams showing a flow of the processing for setting a live time in the first embodiment.

Preferred embodiments of the present invention will be described below with reference to the drawings. Note that constituent elements described in the following embodiments are merely exemplary, and it is not intended to limit the scope of the present invention only to those constituent elements.

First Embodiment

FIG. 1 is a block diagram showing an example of the hardware configuration of an information processing apparatus according to a first embodiment. An area enclosed by a broken line represents an information processing apparatus 10 according to the first embodiment. An image generating apparatus 110 is connected as an external apparatus to the information processing apparatus 10. The image generating apparatus 110 generates a virtual viewpoint image corresponding to a virtual viewpoint output from the information processing apparatus 10, using a plurality of images (images from multiple viewpoints) acquired by shooting (image capturing) from a plurality of directions with a plurality of cameras 109. The information processing apparatus 10, the image generating apparatus 110, and the plurality of cameras 109 constitute an image generation system that generates an image from any virtual viewpoint.

In the information processing apparatus 10, a CPU 101 (Central Processing Unit) performs calculation, logical judgment, and the like for various types of processing so as to control constituent elements connected to a system bus 108. The information processing apparatus 10 is equipped with a memory that includes a program memory and a data memory. A ROM (Read-Only Memory) 102 is the program memory, and stores programs for control that includes various processing procedures, which will be described later, and that is performed by the CPU 101. A RAM (Random Access Memory) 103 is the data memory, and has a work area for a program that is executed by the CPU 101, a data saving area used during error processing, an area for loading a program, and the like.

Note that the program memory may be realized by loading a program to the RAM 103 from an external storage apparatus connected to the information processing apparatus 10 or the like. An HDD 104 is a hard disk for storing a plurality of pieces of electronic data and programs according to this embodiment. The external storage apparatus may be used as playing a similar role. Here, the external storage apparatus can be realized by a medium (recording medium) and an external storage drive for realizing access to the medium, for example. Known examples of such a medium include a flexible disk (FD), a CD-ROM, a DVD, a USB memory, an MO, a flash memory, and the like. In addition, the external storage apparatus may be a server apparatus connected through a network, or the like.

A display unit 105 is a display device for displaying a setting screen for setting a virtual viewpoint and a live time, such as a display, a projector, or an HMD (head mount display). A virtual viewpoint image generated by the image generating apparatus 110 is displayed on the setting screen for setting a virtual viewpoint. A communication I/F 106 is connected to the image generating apparatus 110 and an external storage apparatus by wire or wirelessly using a known communication technique, and allows bidirectional transmission/reception of information. An operation unit 107 is a device for an operator to input a virtual viewpoint to the information processing apparatus 10, and is provided with an input device such as a joystick, a gamepad, a touch panel, a keyboard, or a mouse.

FIG. 2A is a block diagram showing an example of the function configuration of the information processing apparatus 10 according to the first embodiment. The information processing apparatus 10 outputs a virtual viewpoint to the image generating apparatus 110 that generates a virtual viewpoint image based on a plurality of images that have been shot using the plurality of cameras 109. The information processing apparatus 10 has a virtual viewpoint obtaining unit 201, a current time obtaining unit 202, a generation possible time obtaining unit 203, a time lag holding unit 204, a live time setting unit 205, and an image obtaining unit 206. These function units are realized by the CPU 101 loading programs stored in the ROM 102 to the RAM 103, and executing processes that are based on corresponding flowcharts, and will be described later.

The virtual viewpoint obtaining unit 201 converts a signal from the input device that has been input through the operation unit 107 into virtual viewpoint information (information indicating the position, orientation, and the like of a virtual viewpoint). The current time obtaining unit 202 obtains the current time from an internal clock of an external apparatus or the information processing apparatus 10. For example, the current time obtaining unit 202 obtains the current time from a time server that is an external apparatus, via the communication I/F 106. In addition, a configuration may be adopted in which the image generating apparatus 110 has a time server function, and the current time obtaining unit 202 obtains the current time from the image generating apparatus 110.

The generation possible time obtaining unit 203 makes an inquiry to the image generating apparatus 110 via the communication I/F 106, and obtains a time for which a virtual viewpoint image can be generated (a generation possible time), based on a response from the image generating apparatus 110. The time lag holding unit 204 holds a time lag that is a difference between the current time and the generation possible time. The live time setting unit 205 determines a time at which a virtual viewpoint image for live broadcast is to be generated (hereinafter, referred to as a live time), based on the current time obtained by the current time obtaining unit 202 and the time lag held by the time lag holding unit 204. The live time is updated as the current time progresses. The image obtaining unit 206 transmits the virtual viewpoint obtained by the virtual viewpoint obtaining unit 201 and the live time set by the live time setting unit 205, to the image generating apparatus 110 via the communication I/F 106. The image generating apparatus 110 generates a virtual viewpoint image for the virtual viewpoint and the live time. The image obtaining unit 206 obtains the virtual viewpoint image for the transmitted virtual viewpoint and live time, from the image generating apparatus 110.

FIG. 2B is a block diagram showing an example of the function configuration of the image generating apparatus 110 according to the first embodiment. An image data obtaining unit 801 obtains image data from the cameras 109. An image processing unit 802 performs, on image data obtained by the image data obtaining unit 801, image processing such as foreground/background separation and foreground/background model generation. A data set for generating a virtual viewpoint image is generated through the image processing. A data holding unit 803 holds results of processing performed by the image processing unit 802, for each data set and for each frame. A determination unit 811 determines, based on the status of a data set (the status of image processing) held in the data holding unit 803, whether or not a virtual viewpoint image for a time designated from the information processing apparatus 10 can be generated. For example, it is possible to determine whether or not a virtual viewpoint image can be generated, with a configuration that will be described in a second embodiment. As a matter of course, it is possible to actually attempt to generate a virtual viewpoint image and make the determination according to whether or not a virtual viewpoint image could be generated.

A transmission/reception unit 806 performs message transmission/reception and the like with an external apparatus. In this embodiment, the transmission/reception unit 806 receives, from the information processing apparatus 10, a message that indicates a time (generation time) for generating a virtual viewpoint image, and the determination unit 811 determines whether or not a virtual viewpoint image can be generated for the generation time indicated in the message. The determination result is transmitted from the transmission/reception unit 806 to the information processing apparatus 10. A virtual viewpoint image generation unit 812 generates a virtual viewpoint image based on a live time and a virtual viewpoint received from the information processing apparatus 10 that is an external apparatus, using a data set held in the data holding unit 803. The generated virtual viewpoint image is transmitted from the transmission/reception unit 806 to the information processing apparatus 10.

FIG. 3 is a flowchart showing processing of the information processing apparatus according to the first embodiment. The flowchart in FIG. 3 shows processing from when an application for setting a virtual viewpoint starts until when the application ends. Processes of steps S302 to S307 are looped once for each frame in accordance with the frame rate of a virtual viewpoint image that is to be generated. For example, in a case of generating a virtual viewpoint image at 60 fps (frame/second), this loop is repeated 60 times per second.

In step S301, the generation possible time obtaining unit 203 obtains a time for which a virtual viewpoint image can be generated (a generation possible time), and the time lag holding unit 204 holds, as a time lag, the difference between a current time obtained by the current time obtaining unit 202 and the generation possible time. The generation possible time is a time that is earlier than the current time. The image generating apparatus 110 of this embodiment can generate, at the current time, a virtual viewpoint image corresponding to the image-captured time that is before the generation possible time, but cannot generate a virtual viewpoint image corresponding to an image-captured time that is after the generation possible time. Accordingly, the generation possible time obtaining unit 203 of this embodiment obtains time information regarding a time that is before the current time, and corresponds to a virtual viewpoint image that can be generated by the image generating apparatus 110 (a generation possible time). The live time setting unit 205 subtracts the time lag held in the time lag holding unit 204 from the obtained current time, and sets the result as a generation time for generating a virtual viewpoint image for live broadcast (a live time). In addition, in step S307 to be described later, a time (generation time) for which the image generating apparatus 110 is requested to generate a virtual viewpoint image is determined using the time lag held in the time lag holding unit 204. Processing in step S301 will be described later with reference to FIG. 4.

In step S302, the virtual viewpoint obtaining unit 201 determines a virtual viewpoint by converting an operation signal that has been input via the operation unit 107, into information regarding a virtual viewpoint. The virtual viewpoint includes the three-dimensional position, direction, and angle of view of the virtual viewpoint. Note that the virtual viewpoint does not necessarily need to include all of these, and may include one of these, and may include other information such as the depth of field.

In step S303, the image obtaining unit 206 transmits, to the image generating apparatus 110 via the communication I/F 106, an instruction (generation instruction) to generate a virtual viewpoint image, which includes the live time that has been set by the live time setting unit 205 and the position and direction of the virtual viewpoint that has been obtained by the virtual viewpoint obtaining unit 201, and corresponds to this live time. In the image generating apparatus 110, the virtual viewpoint image generation unit 812 generates a virtual viewpoint image viewed at the live time from the virtual viewpoint, using the received live time and virtual viewpoint. The transmission/reception unit 806 transmits the generated virtual viewpoint image to the information processing apparatus 10. In step S304, the image obtaining unit 206 receives and obtains, via the communication I/F 106, the virtual viewpoint image generated by the image generating apparatus 110. In step S305, the image obtaining unit 206 displays, on the display unit 105, the virtual viewpoint image obtained in step S304. If an instruction (end instruction) to end the application for setting a virtual viewpoint is accepted via the operation unit 107 in step S306, this processing is ended.

If it is determined that the end instruction has not been accepted in step S306, the live time setting unit 205 updates the live time to the next live time (the time of a virtual viewpoint image that is obtained next) in step S307, and returns the procedure to step S302. An example of a method for updating the live time in step S307 will be described. The live time setting unit 205 causes the current time obtaining unit 202 to obtain the current time, and sets, as a live time, a result acquired by subtracting a time lag held in the time lag holding unit 204 from this obtained current time. Note that a configuration may be adopted in which, in a case of repeating the processes in steps S304 to S307 in accordance with the frame rate as in this embodiment, the live time setting unit 205 adds the frame rate of a virtual viewpoint image that is generated to the current live time, and sets the added result as a live time. For example, when the frame rate of a virtual viewpoint image is 60 fps, the live time setting unit 205 may set, as a new live time, a result acquired by adding $1/60$ seconds to the live time at the present point in time. In this manner, the information processing apparatus 10 obtains a virtual viewpoint image corresponding to a live time that has been set by the live time setting unit 205, by repeating the processes in steps S302 to S307.

Next, the processing for setting a live time in step S301 will be described. FIG. 4 is a flowchart showing a flow of processing for setting a live time in step S301 in FIG. 3. In this embodiment, the generation possible time obtaining unit 203 transmits, to the image generating apparatus 110, a time for inquiry calculated based on the current time. In the case where a response from the image generating apparatus 110 in response to the transmission of the time for inquiry indicates that a virtual viewpoint image can be generated, the generation possible time obtaining unit 203 determines a time for generating a virtual viewpoint image, based on the transmitted time for inquiry. A detailed description will be given below with reference to the flowchart.

In step S401, the current time obtaining unit 202 obtains the current time. As a method for obtaining the current time, a known technique can be used. For example, the current time obtaining unit 202 may obtain the current time from an internal clock of the information processing apparatus 10, or may obtain the current time from a time server provided outside of the information processing apparatus 10. Note that it is desirable that the time of the time server provided outside is in synchronization with the time of the information processing apparatus 10, the image generating apparatus 110, the cameras 109, and a broadcasting camera other than the cameras 109.

In step S402, the generation possible time obtaining unit 203 transmits, to the image generating apparatus 110 via the communication I/F 106, a time for inquiry calculated based on the current time obtained by the current time obtaining unit 202. The current time obtained by the current time obtaining unit 202 is used as the initial value of the time for inquiry, and after that, the time calculated in step S404 is used. In the image generating apparatus 110, when the transmission/reception unit 806 receives the time for inquiry, the determination unit 811 determines whether or not a virtual viewpoint image corresponding to the time can be generated. The transmission/reception unit 806 transmits the determination result to the information processing apparatus 10 (the communication I/F 106).

In step S403, the generation possible time obtaining unit 203 receives, via the communication I/F 106, the determination result as to whether or not a virtual viewpoint image can be generated, and branches the procedure in accordance with the determination result. If the determination result indicates that the generation is not possible, the procedure advances from step S403 to step S404. In step S404, the generation possible time obtaining unit 203 sets, as a new time for inquiry, a time acquired by subtracting $1/60$ seconds from the time for inquiry, and transmits this to the image generating apparatus 110 (step S402). Processes in steps S404 and S402 are equivalent to setting, as a time for inquiry, a time acquired by subtracting a time value from a current time, and repeating the inquiry while gradually increasing this difference time value (for each loop). In particular, in this embodiment, the time value is gradually increased by adding, to the difference time value, the frame interval time ($1/60$ second) in the frame rate of a virtual viewpoint image that is generated.

On the other hand, if the determination result indicates in step S403 that the generation is possible, the procedure advances to step S405. In step S405, the live time setting unit 205 sets, as a live time, the time transmitted as the time for inquiry by the generation possible time obtaining unit 203 in step S402. In addition, the time lag holding unit 204 holds, as a time lag, the difference between the current time obtained by the current time obtaining unit 202 and the live time that has been set. This is equivalent to holding the above-described difference time value as a time lag. Accordingly, the live time of generation of a virtual viewpoint image is set, and the time lag is held in the time lag holding unit 204.

Note that, in step S404, the generation possible time obtaining unit 203 subtracts $1/60$ seconds from the time for inquiry each time, but there is no limitation thereto, and a time of any magnitude may be subtracted from the time for inquiry. If the magnitude of the time that is subtracted is large, the number of loops decreases, and thus it is possible to shorten the time required for setting a live time. However, the larger the time that is subtracted is, the larger the difference is from the time for which a virtual viewpoint image can be actually generated. By taking these facts into consideration, an appropriate value can be set as the time that is used in step S404, and is subtracted from the time for inquiry.

In addition, in the first embodiment, a case has been described in which the current time obtaining unit 202 obtains the current time only once in step S401, but there is no limitation thereto. A configuration may be adopted in which, every time an inquiry regarding whether or not a virtual viewpoint image can be generated is made to the image generating apparatus 110, the current time is obtained. This is because the current time ceases to be the current time while looping the processes in steps S402 to S404 several times, and, also in the image generating apparatus 110, the time for which a virtual viewpoint image can be generated also progresses. In a case where the current time is obtained every time the inquiry is made, it is sufficient that the procedure is returned to step S401 after the processing in step S404. In addition, in this case, in step S404, the time lag value is increased from 0 by $1/60$ seconds for every loop, and, in step S402, the time acquired by subtracting this time lag value from the most recent current time is used as a time for inquiry. A more appropriate live time can be then obtained by carrying out this loop once every $1/60$ seconds.

Figure 5B:
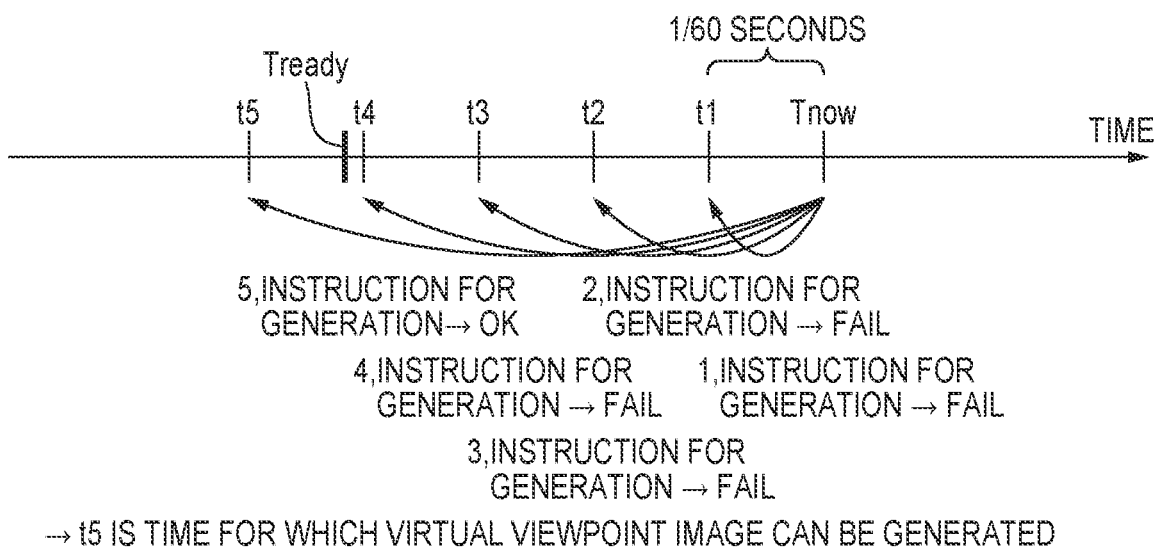

FIGS. 5A and 5B are schematic diagrams illustrating processing for setting a live time in the first embodiment. In FIG. 5A, Tnow denotes a current time, and Tready denotes a time for which the most recent virtual viewpoint image can be generated at the current time Tnow. Tprep indicates a preparation time required to enter a state where a virtual viewpoint image can be generated. At the current time Tnow, when an instruction to generate a virtual viewpoint image for a time T1 is given, the image generating apparatus 110 cannot generate a corresponding virtual viewpoint image. This needs to be avoided since there arises a possibility that a video image is not displayed in sport live broadcast during broadcasting. On the other hand, when an instruction to generate a virtual viewpoint image corresponding to a time T3 is given, the image generating apparatus 110 generates an image. However, the time lag from an image from another broadcasting camera increases, and it is necessary to be careful during image switch. On the other hand, when an instruction to generate a virtual viewpoint image corresponding to a time T2 is given, the image generating apparatus 110 can generate an image, and the time lag from an image from another broadcasting camera decreases. Therefore, it is desirable that a time as close to T2 as possible is set as the live time.

FIG. 5B is a diagram schematically showing the processing for setting a live time in FIG. 4. Tnow denotes the current time, and Tready denotes a time for which the most recent virtual viewpoint image can be generated at the current time Tnow (generation possible time). At the current time Tnow, the generation possible time obtaining unit 203 sets times for inquiry as t1, t2, and t3 sequentially, sends them to the image generating apparatus 110, and acquires a determination result as to whether or not the generation is possible (steps S402 to S404). The difference between the times is 1/60 seconds. Until a time t4, determination results indicating that a virtual viewpoint image cannot be generated are received, but when a time t5 that is earlier than Tready is transmitted, a determination result indicating that a virtual viewpoint image can be generated is received. As a result, the procedure leaves the loop of steps S402 to S404, and the live time setting unit 205 sets the time t5 as a time (generation possible time) for which a virtual viewpoint image can be generated (step S405).

Note that, in step S405, the live time setting unit 205 sets, as a live time, the time for inquiry used by the generation possible time obtaining unit 203 in step S403, but there is no limitation thereto. Actually, a preparation time required to enter a state where a virtual viewpoint image can be generated is not constant. It may vary slightly depending on the number of cameras 109 that are operating, the network band load at that time, and the operation state of the server that performs image processing. Therefore, a time acquired by further subtracting a predetermined margin from the time for inquiry may be used as a live time. This is equivalent to adding the predetermined margin to a differential time value that was set when a response indicating that generation is possible was received from the image generating apparatus 110, and accordingly setting a time lag. For example, the time lag holding unit 204 may hold, as a time lag, a value acquired by adding the predetermined margin to the difference between the live time and the current time.

For example, in the case where it is guaranteed that the frame rate is 60 fps, the variation should be within 1/60 seconds. Thus, in order to make a guarantee for that amount of variation, it is desirable that a margin of about 1/60 seconds is prepared, for example. In other words, it suffices for the following equation to be true:

live time=time for which virtual viewpoint image can be generated−Tα where Tα indicates the above-described margin, which is set to about 1/60 seconds, as described above. In addition, in that case, it is sufficient that the time lag that is held in the time lag holding unit 204 is set as follows:

time lag=current time−(time for which virtual viewpoint image can be generated−Tα).

Alternatively, the variation may be determined based on a predetermined time or the result of performing measurement a predetermined number of times. In this embodiment, a case has been described in which the processing in FIG. 4 is performed only once, but there is no limitation thereto, and the processing in FIG. 4 may be performed a plurality of times in order to detect the variation. For example, a preparation time required to enter a state where a virtual viewpoint image can be generated is measured a plurality of times, and the longest preparation time among the measured preparation times may be set as a time lag. In other words, a configuration may be adopted in which a time lag is obtained a plurality of times, and the longest time lag among the obtained time lags is adopted.

As described above, according to the first embodiment, by sequentially making inquiries regarding times that are retroactive from the current time, a time for which the image generating apparatus 110 can generate a virtual viewpoint image is obtained. Therefore, by obtaining a time for which a virtual viewpoint image can be generated, it is possible to reliably generate a virtual viewpoint image, and to generate a virtual viewpoint image in which delay from the current time is small. Therefore, in live relay broadcast of a sport or the like, it is possible to reliably continue creating a virtual viewpoint image, and it is possible to reduce the time lag from a live image from another broadcast camera. In addition, it is possible to reduce the influence from a switch between a video image shot with a broadcast camera and a virtual viewpoint image.

Second Embodiment

In the first embodiment, a configuration has been described in which the information processing apparatus 10 obtains a time for which the image generating apparatus 110 can generate a virtual viewpoint image, by successively increasing the time lag from the current time and inquiring whether or not a virtual viewpoint image can be generated. In a second embodiment, a configuration will be described in which a time for which the image generating apparatus 110 can generate a virtual viewpoint image is returned in response to an inquiry from the information processing apparatus 10. The configurations of an image generation system and the information processing apparatus 10 are similar to those in the first embodiment (FIGS. 1 and 2A).

Figure 6:
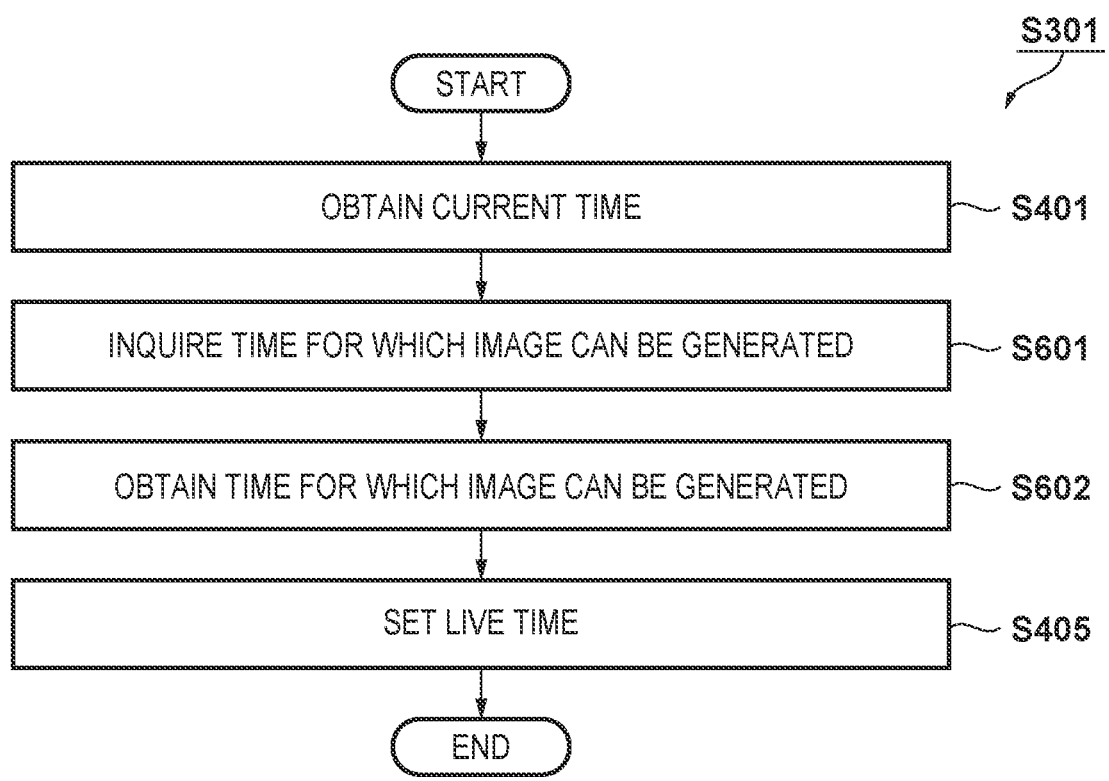
FIG. 6 is a flowchart showing processing for setting a live time in a second embodiment.

FIG. 6 is a flowchart showing processing for setting a live time in step S301 in FIG. 3 in the second embodiment. The same numerals are assigned to steps for performing the same processes as in FIG. 4. In the second embodiment, when the generation possible time obtaining unit 203 makes an inquiry to the image generating apparatus 110 about a time for which a virtual viewpoint image can be generated, the image generating apparatus 110 returns a time for which a virtual viewpoint image can be generated, in response to this inquiry. The generation possible time obtaining unit 203 determines a time for which a virtual viewpoint image is to be generated, based on the time included in this response from the image generating apparatus 110. A description will be given below with reference to the flowchart in FIG. 6.

In step S401, the current time obtaining unit 202 obtains the current time. This processing is as described in the first embodiment. Next, in step S601, the generation possible time obtaining unit 203 makes an inquiry to the image generating apparatus 110 about a time for which a virtual viewpoint image can be generated, via the communication I/F 106. The image generating apparatus 110 transmits a time for which a virtual viewpoint image can be generated, to the information processing apparatus 10 in response to this inquiry. In step S602, the generation possible time obtaining unit 203 receives the time for which a virtual viewpoint image can be generated, from the image generating apparatus 110 via the communication I/F 106. In step S405, the live time setting unit 205 sets, as a live time, the time obtained by the generation possible time obtaining unit 203 in step S602. In addition, the time lag holding unit 204 sets a time lag based on the difference between the current time (the time when the inquiry was performed) obtained by the current time obtaining unit 202 in step S401 and the live time (the time included in the response) that has been set, and saves the time lag. Note that this difference may be used as a time lag, but a time lag may be set in consideration of the margin described in the first embodiment. In addition, a configuration may be adopted in which a time for which a virtual viewpoint image can be generated is obtained from the image generating apparatus 110 a plurality of times, and one (for example, a time for which the difference is largest) is adopted from among the plurality of times, similarly to the first embodiment.

In the second embodiment, the image generating apparatus 110 has a function for detecting a time for which a virtual viewpoint image can be generated, at the time of receiving an inquiry. A method for detecting and transmitting a time for which the image generating apparatus 110 can generate a virtual viewpoint image will be described with reference to FIGS. 7A and 7B.

Figure 7A:
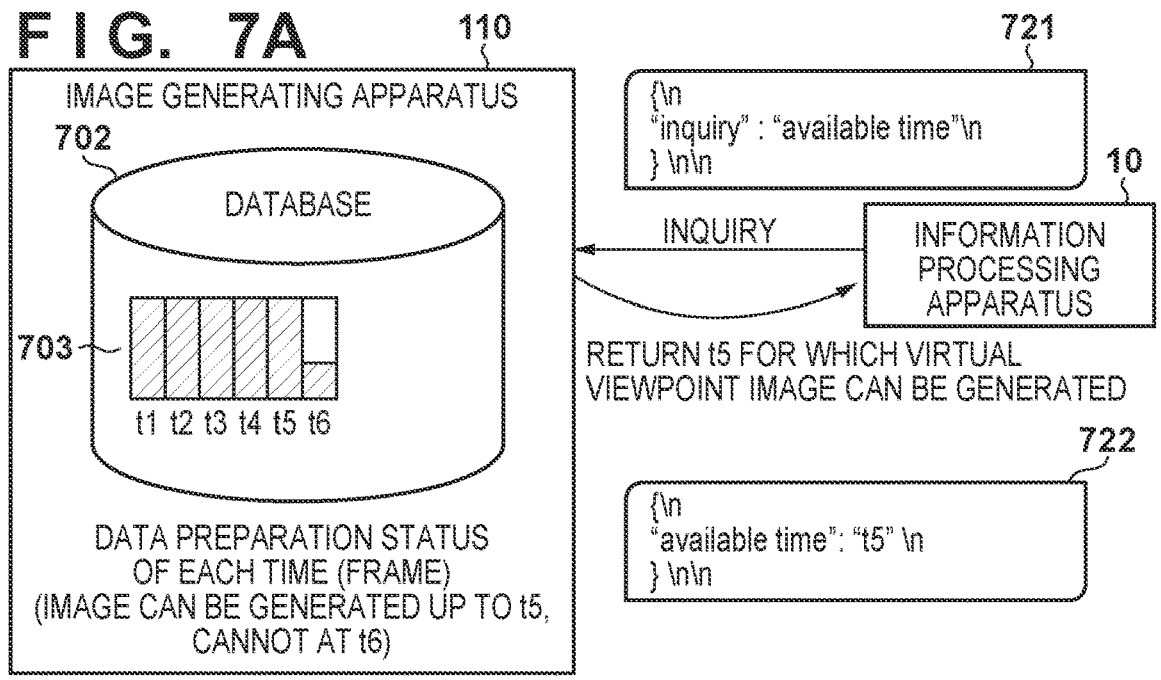
FIGS. 7A and 7B are schematic diagrams showing a data preparation status of an image generating apparatus in the second embodiment.
Figure 7B:
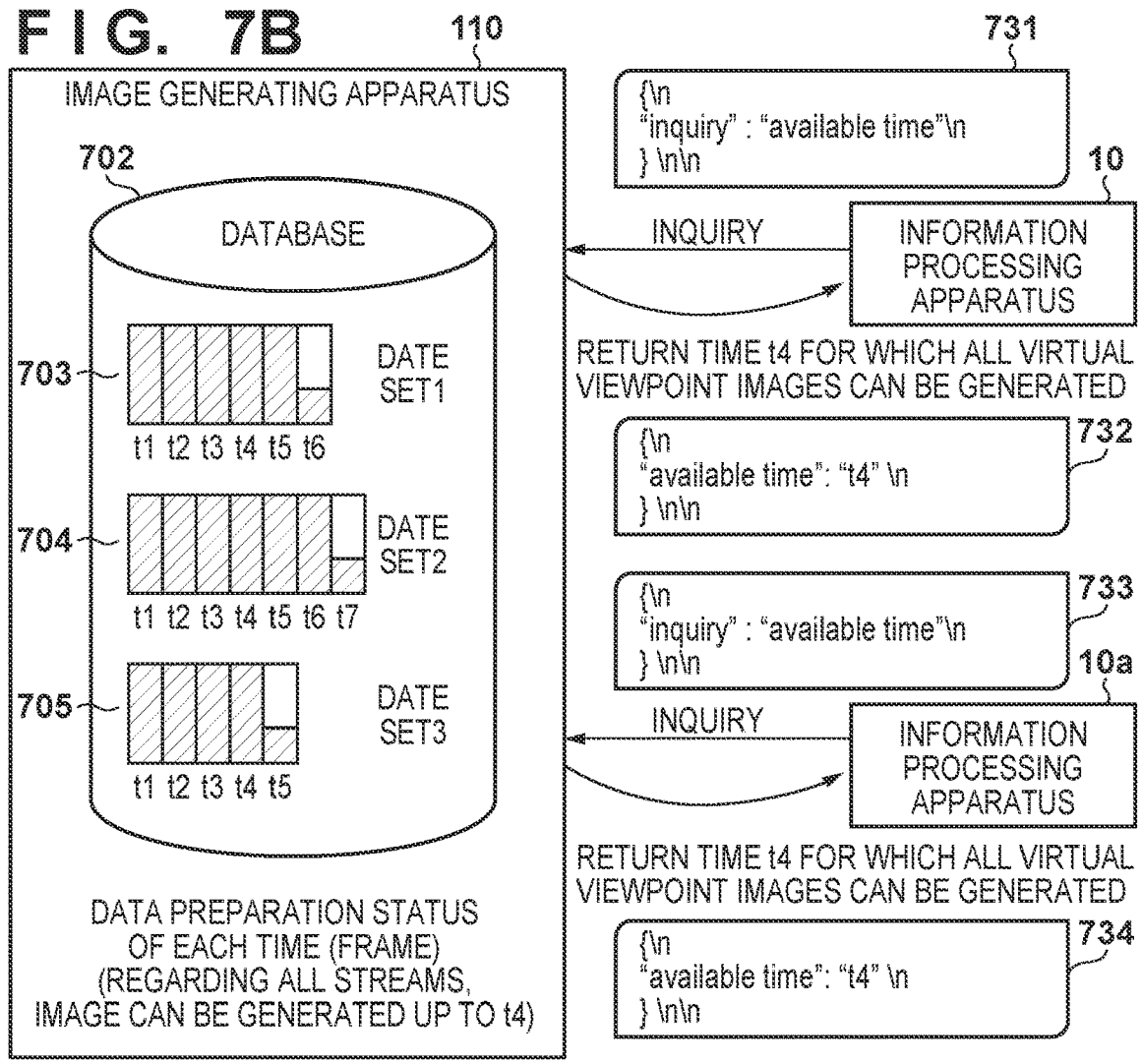

FIGS. 7A and 7B are schematic diagrams showing the data preparation status of the image generating apparatus 110 in the second embodiment. In FIG. 7A, the image generating apparatus 110 has a database 702. The database 702 stores image data captured with the cameras 109, a data set that includes model data of a foreground and a background obtained by performing image processing on image data, and the like. A data set 703 indicates a data preparation status of each time (frame). The data set 703 indicates that data required for generating a virtual viewpoint image is prepared from a time t1 to a time t5, and is in preparation at a time t6. In other words, the image generating apparatus 110 that is obtaining the data set can generate a virtual image up to the time t5 based on the obtained data set, and cannot generate a virtual image at the time t6. If processing for setting a flag or the like is performed when data is prepared, detection of the preparation status can be realized easily.

An inquiry message 721 is an example of a message for inquiring about a time for which a virtual viewpoint image can be generated. In the second embodiment, an example of a case of complying with the JSON format is described. Here, "inquiry" is set as a key, and "available time" is set as a value. The information processing apparatus 10 makes an inquiry to the image generating apparatus 110 about a time for which a virtual viewpoint image can be generated, using this inquiry message 721. On the other hand, a response message 722 is an example of a message that is transmitted as a response to the inquiry. The response message 722 is transmitted from the image generating apparatus 110 to the information processing apparatus 10. In the response message 722, the content of the inquiry is written as a key, and a time for which a virtual viewpoint image can be generated is written as the value thereof. In the example of the response message 722, the time t5 for which a virtual viewpoint image can be generated is written. Note that, in FIG. 7A, a time is expressed as a variable such as t1 or t2, but a time is generally expressed as a second, a minute, an hour, and a frame number such as "12:34:56:12". This format is called a time code. It is needless to say that messages used in communication with the image generating apparatus 110 may be in any data format if both the image generating apparatus 110 and the information processing apparatus 10 can interpret the messages.

FIG. 7B is a schematic diagram in a case of generating a plurality of virtual viewpoint images at the same time. There are two information processing apparatuses (10 and 10a) that set viewpoints. In the database 702 of the image generating apparatus 110, there are three data sets (703, 704, and 705). The reason that there are a plurality of data sets is that the cameras 109 capture different regions. In an example of a case of soccer, two pairs of camera sets may be prepared, such as a camera 109 that captures images in the vicinity of the goal on the home team side and a camera 109 that captures images in the vicinity of the goal on the away team side. In a case of generating a virtual viewpoint image of a play performed on the home team side, the data set 703 is used, and in a case of generating a virtual viewpoint image of a play performed on the away team side, the data set 704 is used.

Note that in the case of generating a plurality of virtual viewpoint images whose viewpoints are different, there are cases where access to the database becomes a bottleneck and image generation delays. In order to avoid this, parallelizing the database is effective. Due to parallelization processing, a time for which a virtual viewpoint image can be generated may be slightly different between the data set 703, the data set 704, and the data set 705. In FIG. 7B, the data set 703 indicates that data for generating a virtual viewpoint image up until t5 is prepared, the data set 704 indicates that data for generating a virtual viewpoint image up until t6 is prepared, and the data set 705 indicates that data for generating a virtual viewpoint image up until t4 is prepared.

It is desirable that images that are output from cameras in live relay broadcast are time-synchronized. Similarly, it is desirable that live times that are set by different information processing apparatuses are synchronized. With this configuration, generated virtual viewpoint images are time-synchronized. As a method for realizing this, it is conceivable that the live time is adjusted to match the time of a data set whose data preparation status is slowest among the data sets. In order to realize this, the image generating apparatus 110 is aware of the preparation statuses of the data sets, and returns the time of a data set whose preparation status is slowest. In FIG. 7B, the image generating apparatus 110 returns the time t4 of the data set 705 whose data preparation status is slowest.

When the information processing apparatus 10 sends an inquiry message 731 to the image generating apparatus 110, the image generating apparatus 110 returns a response message 732. The inquiry message 731 is the same as the inquiry message 721 in FIG. 7A. In the response message 732, t4 is set as "available time". Similarly, when the information processing apparatus 10a sends an inquiry message 733 to the image generating apparatus 110, the image generating apparatus 110 returns a response message 734. Also in this case, in the response message 734, t4 is set as "available time".

The image generating apparatus 110 of the second embodiment that performs the above-described operation will be described. Note that, a configuration in a case where a plurality of virtual viewpoint images are generated at the same time as shown in FIG. 7B will be described below. FIG. 8 is a block diagram showing the function configuration of processing in a case where the image generating apparatus 110 generates a plurality of virtual viewpoint images at the same time according to the second embodiment. The same reference numerals are assigned to constituent elements similar to those in the first embodiment (FIG. 2B). Note that, in FIG. 8, the virtual viewpoint image generation unit 812 is not illustrated.

The image data obtaining unit 801 obtains image data from the cameras 109. The image processing unit 802 performs image processing such as foreground/background separation and foreground/background model generation, on image data obtained by the image data obtaining unit 801. The data holding unit 803 holds the result of the processing of the image processing unit 802, for each data set and for each frame. A preparation status detection unit 804 detects the preparation status of a data set. In this example, there are a plurality of data sets, and the preparation status detection unit 804 detects which frame of each data set is a frame up to which a virtual viewpoint image can be generated, by checking the content of the data holding unit 803. A preparation status holding unit 805 holds the result of the preparation status detection unit 804 detecting a preparation status. The transmission/reception unit 806 receives inquiry messages from the information processing apparatuses 10 and 10a, and transmits, to the information processing apparatuses 10 and 10a, a response message to this inquiry.

Figure 9:
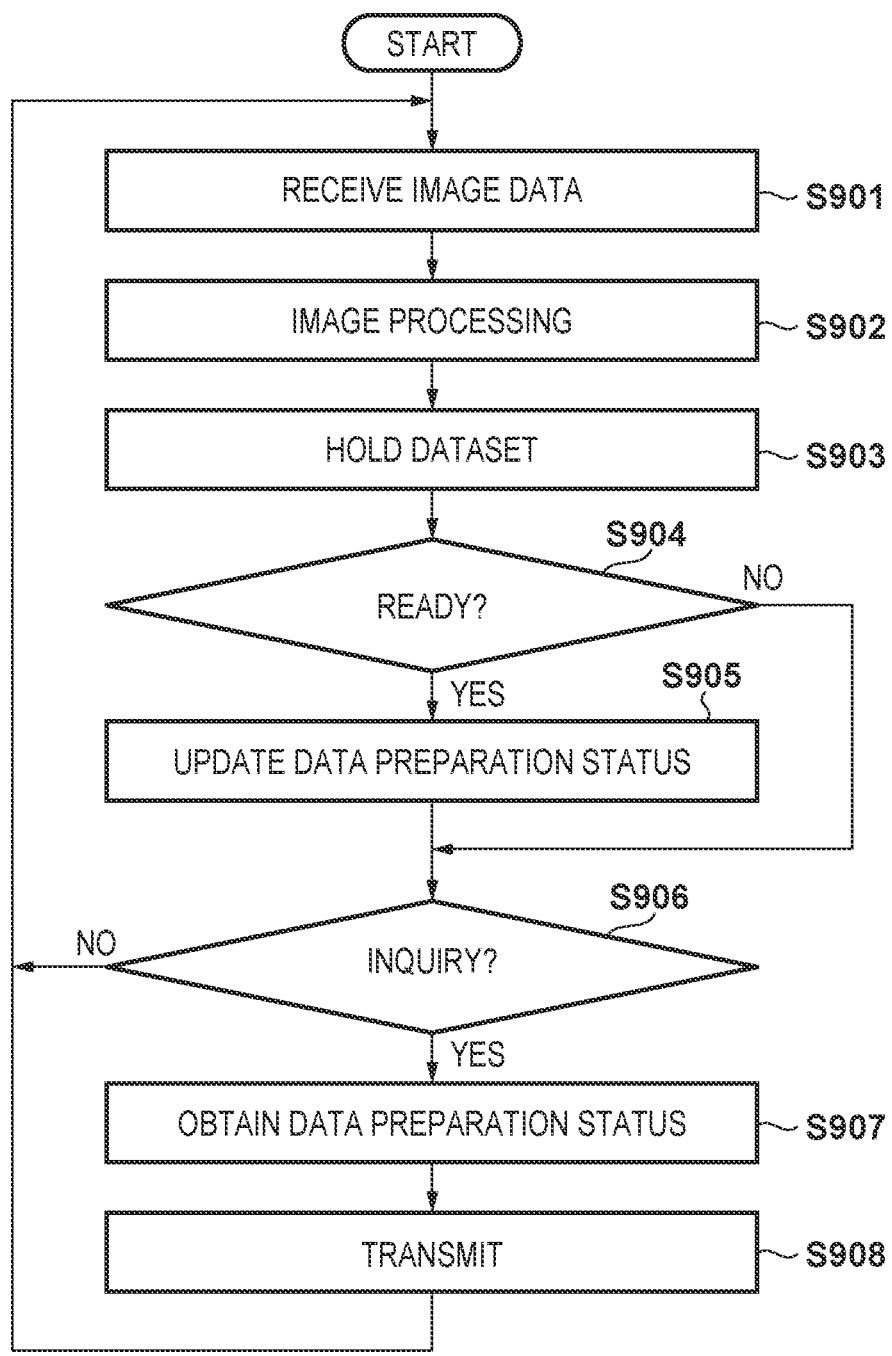
FIG. 9 is a flowchart showing processing of the image generating apparatus in the second embodiment.

FIG. 9 is a flowchart showing processing in which the image generating apparatus 110 generates a plurality of virtual viewpoint images at the same time. The image generating apparatus 110 detects the time of a data set whose data preparation status is slowest among the data sets, as a time for which a virtual viewpoint image can be generated, and transmits the detected time.

In step S901, the image data obtaining unit 801 receives image data from the cameras 109. The image data includes image data captured with a plurality of cameras 109. In step S902, the image processing unit 802 performs image processing such as foreground/background separation and foreground/background model generation, on image data obtained by the image data obtaining unit 801. In step S903, the data holding unit 803 holds the result of the processing of the image processing unit 802, for each data set and for each frame.

In step S904, the preparation status detection unit 804 checks the data preparation status of each frame of each data set held in the data holding unit 803. The data preparation status indicates whether or not data such as foreground/background models required for generating a virtual viewpoint image of a certain frame is prepared. If it is detected that data preparation for a frame of a data set is newly complete (YES in step S904), the procedure advances to step S905. On the other hand, if the data preparation status has not changed (NO in step S904), the procedure advances to step S906.

In step S905, the preparation status detection unit 804 sets, to "complete", the preparation status of a frame for which data preparation is newly complete, and stores the preparation status in the preparation status holding unit 805. Furthermore, the preparation status detection unit 804 causes the preparation status holding unit 805 to hold the preparation status of a data set (a frame whose data preparation is complete) that is slowest among all of the data sets, as a time for which a virtual viewpoint image can be generated.

In step S906, if the transmission/reception unit 806 detects an inquiry from the information processing apparatus 10, the procedure advances to step S907. In step S907, the transmission/reception unit 806 obtains the time for which a virtual viewpoint image can be generated, and that is held in the preparation status holding unit 805. In step S908, the transmission/reception unit 806 transmits the time obtained in step S907, to the information processing apparatus 10 that transmitted the inquiry. After that, the procedure returns to step S801. On the other hand, if it is determined in step S906 that no inquiry has been detected, the procedure returns to step S901 as is.

Note that, a case has been described in which a margin Tα that allows the information processing apparatus 10 to suppress variation in step S405 of the first embodiment is provided. As described in the second embodiment, even in a case where the image generating apparatus 110 holds a plurality of data sets, the preparation status detection unit 804 of the image generating apparatus 110 preferably determines the margin Tα. If a plurality of information processing apparatuses 10 respectively set margins, the live time varies due to the margin, and thus time synchronization is not secured. It is possible to secure time synchronization by providing the margin Tα that is common in the preparation status detection unit 804.

As described above, in the second embodiment, a time for which a virtual viewpoint image can be generated is obtained as a result of the information processing apparatus 10 inquiring the image generating apparatus 110. Accordingly, it is possible to acquire a time for which a virtual viewpoint image can be generated, in a shorter time than in the first embodiment.

Third Embodiment

In the first and second embodiments, cases have been described in which a time for which a virtual viewpoint image can be generated is obtained as a result of the information processing apparatus 10 and the image generating apparatus 110 cooperating with each other, but there is no limitation thereto. In a third embodiment, a configuration will be described in which the user inputs a generation time of a virtual viewpoint image (a time for inquiry), and whether or not the image generating apparatus 110 can generate a virtual viewpoint image for the designated time is returned to the information processing apparatus 10. Note that the function configurations of the information processing apparatus 10 and the image generating apparatus 110 are similar to those in the first embodiment (FIG. 2A). Note that the generation possible time obtaining unit 203 and the time lag holding unit 204 function as follows.

Figure 10:
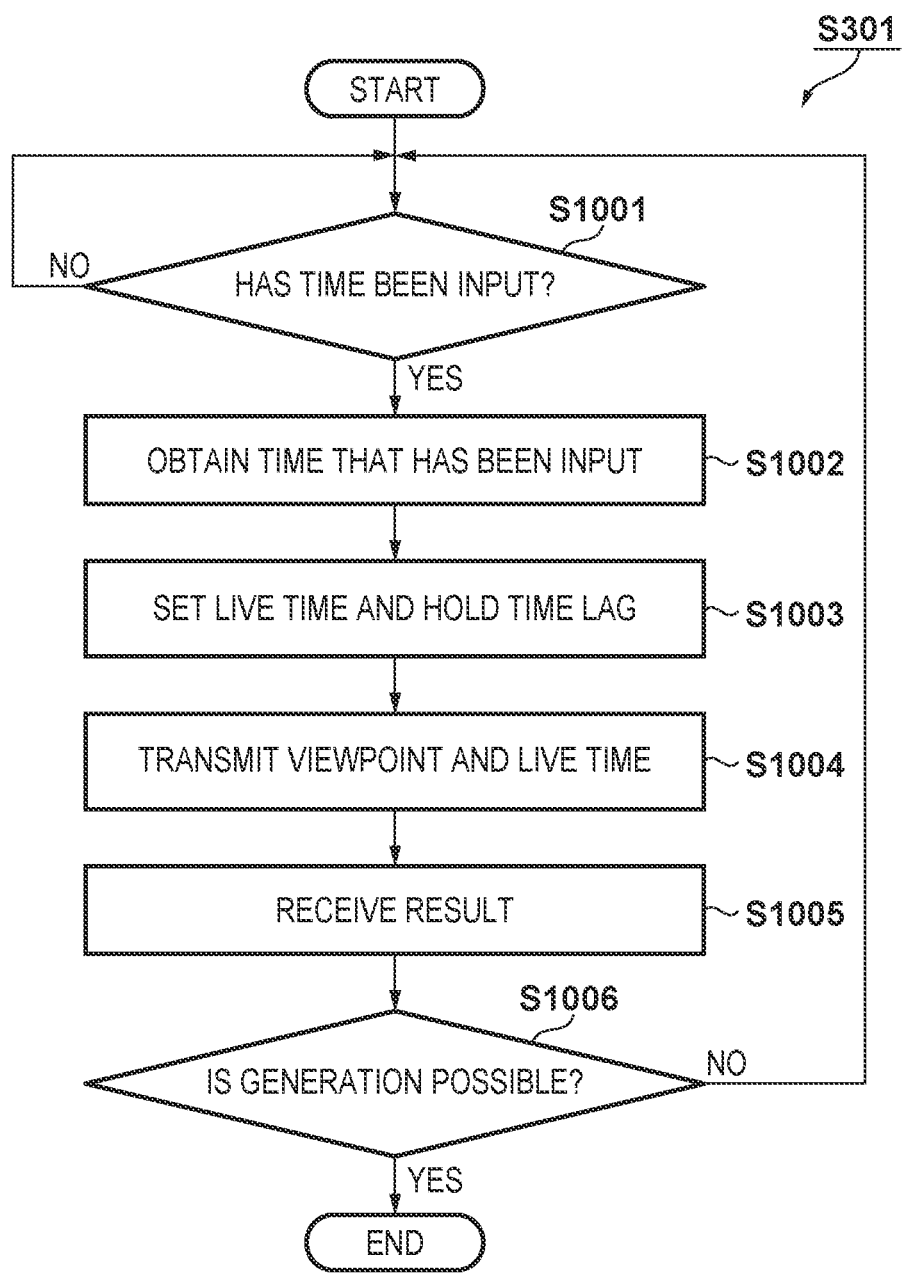
FIG. 10 is a flowchart showing processing for setting a live time in a third embodiment.

FIG. 10 is a flowchart showing processing for setting a live time (the processing in step S301 in FIG. 3) according to the third embodiment. In step S1001, the generation possible time obtaining unit 203 waits for the user to input a time through the operation unit 107, and when detecting the input time, advances the procedure to step S1002. In step S1002, the generation possible time obtaining unit 203 obtains the time that has been input via the operation unit 107. In step S1003, the live time setting unit 205 sets, as a live time, the time obtained by the generation possible time obtaining unit 203, and the time lag holding unit 204 holds, as a time lag, the difference between the live time and the current time. In step S1004, the image obtaining unit 206 transmits the live time that has been set by the live time setting unit 205 and a viewpoint, to the image generating apparatus 110 via the communication I/F 106 (transmission attempt). This transmission attempt is an example of an inquiry that is transmitted to the image generating apparatus 110. The viewpoint transmitted here may be a viewpoint prepared in advance for transmission attempt, or may be any viewpoint such as an initial value at the time of startup.

In step S1005, the live time setting unit 205 determines whether or not a virtual viewpoint image generated by the image generating apparatus 110 has been received in the communication I/F 106. In the case where the image generating apparatus 110 could not generate a virtual viewpoint image, a generation error signal is received. In step S1006, the live time setting unit 205 determines the reception result in step S1005, and if an image could be generated, this processing ends. In this case, the time lag held in step S1003 is used for calculating generation times of subsequent virtual viewpoint images. In other words, a time lag is set based on the time difference between the user-input time for which a response indicating that generation is possible is received from the image generating apparatus 110 and the current time when this user-input time was transmitted. From this point on, the live time setting unit 205 updates the live time (a generation time of a virtual viewpoint image) by subtracting the time lag from the current time. On the other hand, if an image could not be generated, the procedure returns to step S1001. At this time, as will be described later, the live time setting unit 205 displays, on the operation unit 107, a message indicating that a virtual viewpoint image cannot be generated for the designated time.

Figure 11A:
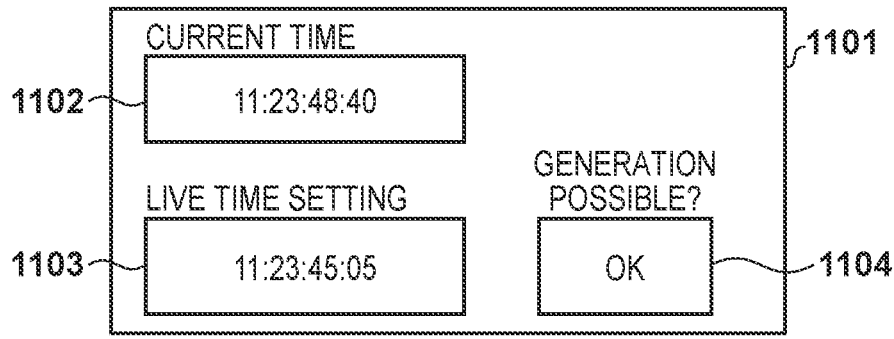
FIGS. 11A to 11C are schematic diagrams showing a method for inputting a live time in the third embodiment.
Figure 11B:
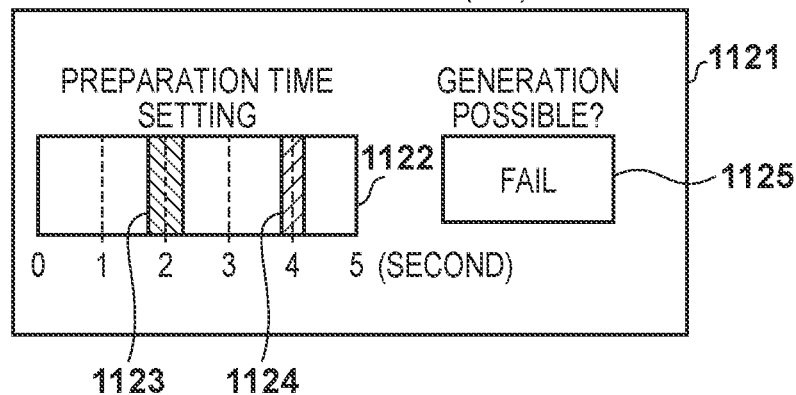
Figure 11C:
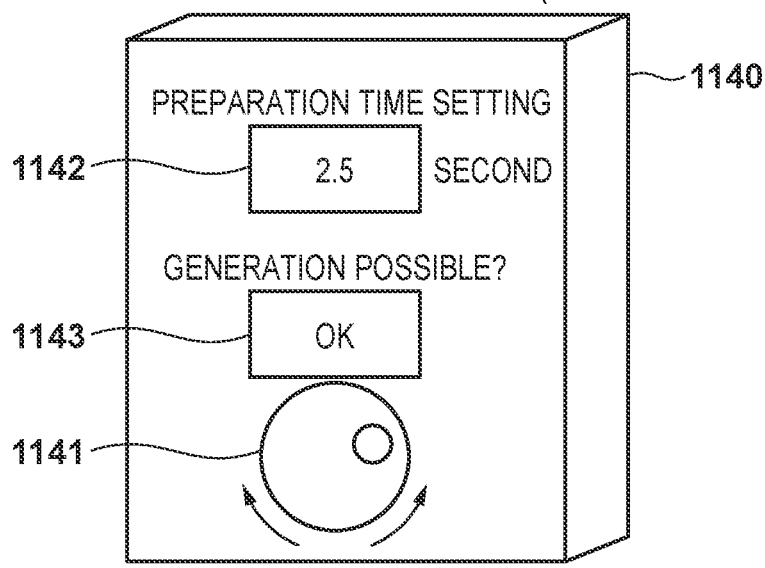

FIGS. 11A to 11C are schematic diagrams showing examples of GUIs and an input device for accepting designation of a time for which the user generates a virtual viewpoint image, which are realized by the operation unit 107.

FIG. 11A is a schematic diagram in a case where a time is input as text in a GUI form. Reference numeral 1101 denotes a time setting window, reference numeral 1102 denotes a current time display area, reference numeral 1103 denotes a time input form, and reference numeral 1104 denotes an area for displaying a determination result as to whether or not a virtual viewpoint image can be generated for a time that has been input by the user. The user inputs an operation for designating a live time, based on the current time, and thus the current time display area 1102 is preferably arranged on the same screen as the time input form 1103. The determination result in step S1006 is displayed in the determination result display area 1104.

FIG. 11B is a schematic diagram in a case of inputting, in a GUI form, a preparation time required to enter a state where a virtual viewpoint image can be generated. Reference numeral 1121 denotes a time setting window, and reference numeral 1122 denotes an input slider for setting a length of time from a current time (a preparation time). Reference numeral 1123 denotes a GUI component equivalent to the bar of the input slider 1122, and reference numeral 1124 denotes a bar that indicates a recommendation value calculated from past history. A determination result display area 1125 is an area for displaying whether or not a virtual viewpoint image can be generated in the preparation time that has been input by the user (the determination result in step S1106). The preparation time is held in the time lag holding unit 204. By inputting a preparation time using the slider, it is possible to reduce the trouble for the user to input a time as text.

FIG. 11C is a schematic diagram in a case where a preparation time required to enter a state where a virtual viewpoint image can be generated is input to an input device. Reference numeral 1140 denotes the input device, and reference numeral 1141 denotes a dial for inputting a preparation time. In addition, reference numeral 1142 denotes an area for displaying a preparation time that is set by operating the dial 1141. A determination result display area 1143 is an area for displaying whether or not a virtual viewpoint image can be generated for a preparation time that has been input by the user (the determination result in step S1106). Note that any device component such as a slider may be used in place of the dial 1141.

Note that, in step S1004, a virtual viewpoint is transmitted along with a live time, but there is no limitation thereto, and it is possible to transmit only a live time. In addition, in a case where a virtual viewpoint image can be generated, the image generating apparatus 110 may transmit a signal indicating that a virtual viewpoint image can be generated as in the first embodiment, instead of returning a virtual viewpoint image. In that case, for example, the live time setting unit 205 receives, via the communication I/F 106, a signal indicating whether or not a virtual viewpoint image can be generated, in step S1005. In addition, the determination result in step S1006 is displayed in the determination result display areas 1104, 1125, and 1143. In the case where, in step S1006, the response from the image generating apparatus 110 indicates that an image cannot be generated, a message to this effect (FAIL) is displayed in these determination result display areas, the user is prompted to input a time again.

FIG. 12A to 12C are schematic diagrams showing examples of transmission/reception messages in the third embodiment. FIG. 12A shows a message 1201 when the information processing apparatus 10 makes an inquiry to the image generating apparatus 110. The message 1201 is transmitted in step S1004. In this example, whether or not a virtual viewpoint image for "0:33:21:45 frame" can be generated is inquired. FIGS. 12B and 12C show examples of a response message to the inquiry message 1201. FIG. 12B shows an example of a message 1202 for notifying that a virtual viewpoint image can be generated, and FIG. 12C shows an example of a message 1203 for notifying that a virtual viewpoint image cannot be generated. The messages 1202 and 1203 are received in step S1005. Needless to say, messages used in communication with the image generating apparatus 110 may be in any data format if both the image generating apparatus 110 and the information processing apparatus 10 can interpret the messages.

As described above, according to the third embodiment, as a result of the user inputting, as a time for inquiry, an estimated or desired time for which a virtual viewpoint image can be generated, a live time can be set. Accordingly, there is an advantage that a function for obtaining a time for which a virtual viewpoint image can be generated does not need to be implemented in the information processing apparatus 10 and the image generating apparatus 110.

Fourth Embodiment

In the first to third embodiments, cases have been described in which, when generating a virtual viewpoint image for live broadcast, the information processing apparatus 10 transmits a time and virtual viewpoint desired for generating a virtual viewpoint image in consideration of a time for which a virtual viewpoint image can be generated, but there is no limitation thereto. In a fourth embodiment, a configuration will be described in which, when generating a virtual viewpoint image for live broadcast, the information processing apparatus 10 transmits a virtual viewpoint without transmitting a time.

Figure 13A:
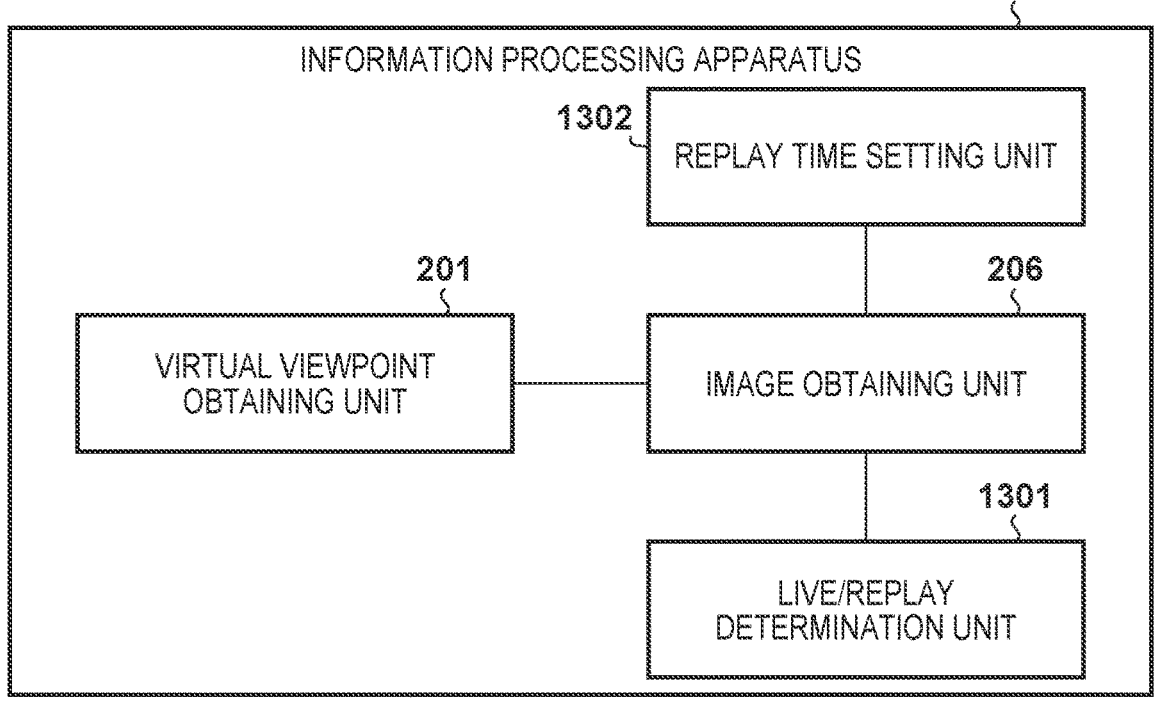
FIG. 13A is a block diagram showing an example of the function configuration of an information processing apparatus in a fourth embodiment.

FIG. 13A is a block diagram showing the function configuration of the information processing apparatus 10 in this embodiment. The same reference numerals are assigned to functional blocks similar to those in FIG. 2A. A live/replay determination unit 1301 determines whether a viewpoint that is be to set is a viewpoint for live broadcast or a viewpoint for replay. The determination method may be any method, and, for example, a live/replay switch button is provided on the GUI or the like. A replay time setting unit 1302 sets a time for generating a replay image. The method for setting a replay time may be any method, and, for example, GUI input or an input device is prepared.

Figure 13B:
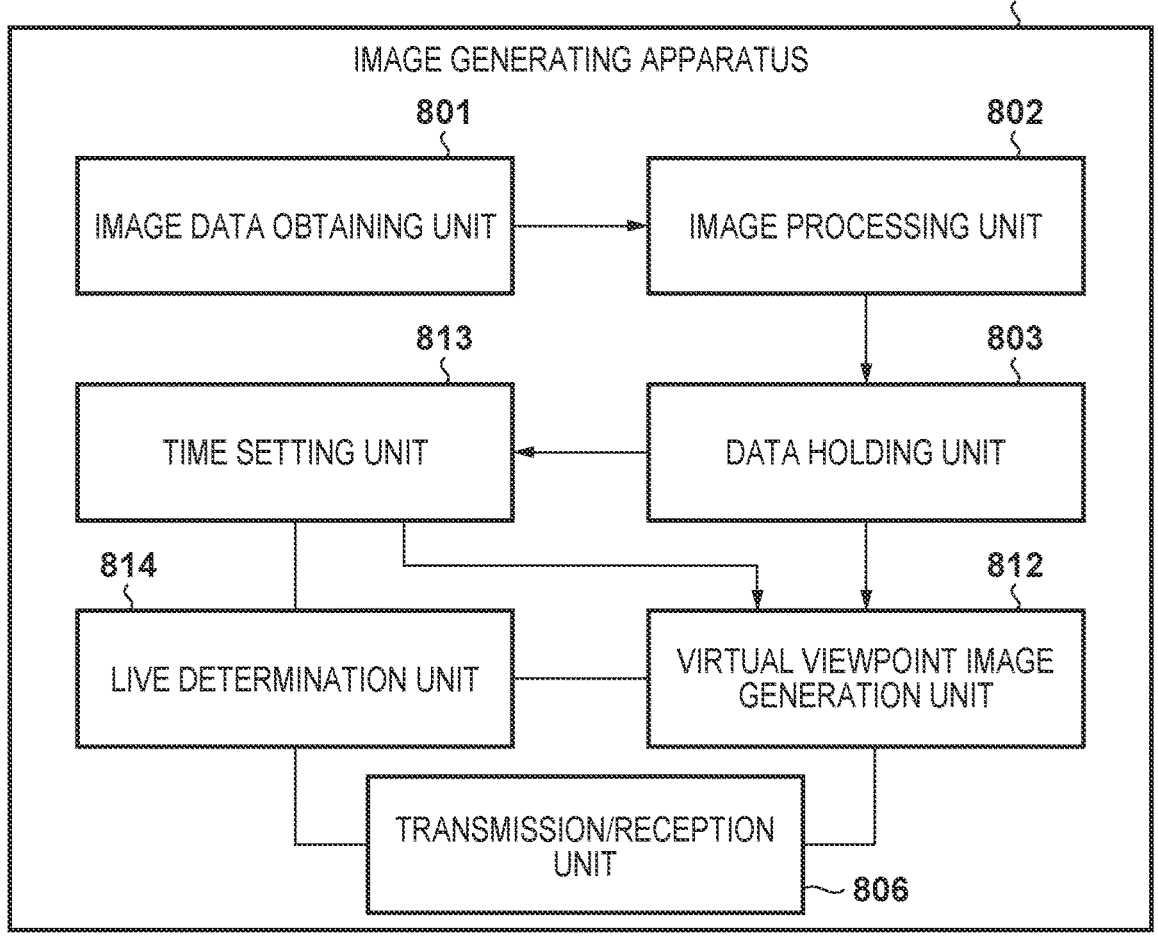
FIG. 13B is a block diagram showing an example of the function configuration of an image generating apparatus in the fourth embodiment.

FIG. 13B is a block diagram showing an example of the function configuration of the image generating apparatus 110. The same reference numerals are assigned to functional blocks similar to those in FIG. 2B. A live determination unit 814 determines whether a message of a virtual viewpoint from the information processing apparatus 10 includes an instruction to generate a virtual viewpoint image for live broadcast or a virtual viewpoint image for replay. A time setting unit 813 sets, based on the data setting status in the data holding unit 803, a time for which a virtual viewpoint image can be generated.

Figure 14:
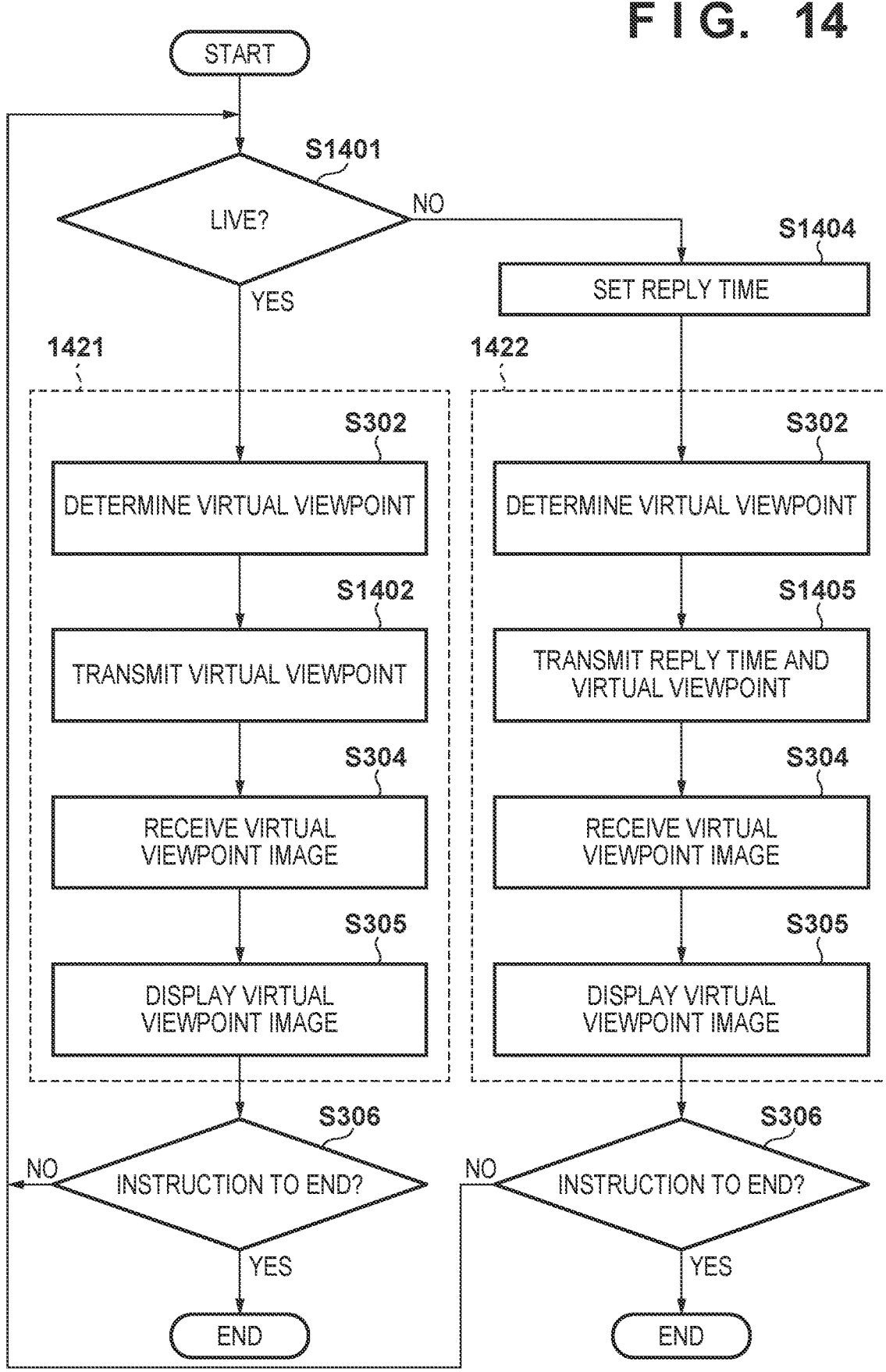
FIG. 14 is a flowchart showing processing of the information processing apparatus in the fourth embodiment.

FIG. 14 is a flowchart showing processing of the information processing apparatus 10 in the fourth embodiment. The same numerals are assigned to steps for performing the same processes as those in FIG. 3. In step S1401, the live/replay determination unit 1301 determines whether a virtual viewpoint image that is to be generated is a virtual viewpoint image for live broadcast or a virtual viewpoint image for replay. In a case of a virtual viewpoint image for live broadcast, the procedure advances to step S302, and in a case of a virtual viewpoint image for replay, the procedure advances to step S1404.

In step S302, the virtual viewpoint obtaining unit 201 obtains a virtual viewpoint from a signal that has been input via the operation unit 107. In step S1402, the image obtaining unit 206 transmits the virtual viewpoint obtained by the virtual viewpoint obtaining unit 201, to the image generating apparatus 110 via the communication I/F 106. A time is not transmitted here. The image generating apparatus 110 that has received the virtual viewpoint from the information processing apparatus 10 generates a virtual viewpoint image, using as recently shot an image as possible, and transmits the generated virtual viewpoint image to the information processing apparatus 10. In step S304, the communication I/F 106 receives the virtual viewpoint image generated and transmitted by the image generating apparatus 110. In step S305, the display unit 105 displays the virtual viewpoint image received by the communication I/F 106. In step S306, if an instruction to end the virtual viewpoint setting application is accepted via the operation unit 107, this procedure ends. If the end instruction has not been accepted, the procedure returns to step S1401.

In step S1404, the replay time setting unit 1302 sets a time for which a replay image is to be generated. In step S302, the virtual viewpoint obtaining unit 201 obtains a virtual viewpoint from a signal that has been input via the operation unit 107. In step S1405, the image obtaining unit 206 transmits the virtual viewpoint obtained by the virtual viewpoint obtaining unit 201 and the replay time that has been set by the replay time setting unit 1302, to the image generating apparatus 110 via the communication I/F 106. The image generating apparatus 110 that received the virtual viewpoint and the replay time generates a virtual viewpoint image corresponding to the virtual viewpoint and the replay time, and transmits the generated virtual viewpoint image to the information processing apparatus 10. Operations in step S304 to step S306 are as described above.

In FIG. 14, processing 1421 indicates processing for generating an image for live broadcast, and processing 1422 indicates processing for generating an image for replay. In a comparison between the processing 1421 and the processing 1422, a time is not set in live broadcast, and a time is set for replay. As described above, in the fourth embodiment, if the live/replay determination unit 1301 determines that generation of a virtual viewpoint image for live broadcast is set, the image obtaining unit 206 transmits a virtual viewpoint for generating a virtual viewpoint image, to the image generating apparatus 110, but does not transmit a generation time. On the other hand, if the live/replay determination unit 1301 determines that generation of a virtual viewpoint image for replay is set, the image obtaining unit 206 transmits a virtual viewpoint and a generation time to the image generating apparatus 110. Accordingly, the information processing apparatus 10 can switch between a mode (replay mode) in which designation of a time is included in an instruction to generate a virtual viewpoint image, which is to be output to the image generating apparatus 110, and a mode (live mode) in which designation of a time is not included in the instruction to generate a virtual viewpoint image.

FIGS. 15A and 15B are schematic diagrams showing examples of a message of a virtual viewpoint for live broadcast that is transmitted in step S1402 and a message of a virtual viewpoint for replay that is transmitted in step S1405. FIG. 15A shows a virtual viewpoint message 1501 for live broadcast that is transmitted in step S1402. "LIVE" is designated in "time code", and thereby it is indicated that this virtual viewpoint message 1501 is a virtual viewpoint message for live broadcast. On the other hand, FIG. 15B shows a virtual viewpoint message 1502 for replay that is transmitted in step S1405. In "time code" of the virtual viewpoint message 1502, a time for which a replay image is to be generated is set.

Next, the image generating apparatus 110 in the fourth embodiment will be described. Upon receiving a virtual viewpoint message shown in FIG. 15A or 15B, the image generating apparatus 110 analyzes the virtual viewpoint message received by the live determination unit 814, and determines whether or not the received virtual viewpoint message is a virtual viewpoint message for live broadcast. The determination on whether or not the received virtual viewpoint message is a virtual viewpoint message for live broadcast can be performed according to whether or not "LIVE" is set in "time code" of the virtual viewpoint message. In this embodiment, setting of a live time is performed by the time setting unit 813 of the image generating apparatus 110. The time setting unit 813 has modules shown in FIG. 2A (the information processing apparatus 10), for example, and sets a live time in accordance with the processing shown in FIG. 4. Note that step S402 (time transmission processing) is unnecessary. As a matter of course, a configuration may be adopted in which a time for which the image generating apparatus 110 can generate a virtual viewpoint image is obtained, and this is set as a live time, according the configuration described in the second embodiment. If the live determination unit 814 determines that the received virtual viewpoint message is a virtual viewpoint message for live broadcast, the virtual viewpoint image generation unit 812 generates a virtual viewpoint image for the time that has been set by the time setting unit 813. On the other hand, if the live determination unit 814 determines that the received virtual viewpoint message is a virtual viewpoint message for replay, the virtual viewpoint image generation unit 812 generates a virtual viewpoint image corresponding to the generation time included in the received message.

As described above, according to the fourth embodiment, the image generating apparatus 110 can set a live time. Accordingly, when generating a virtual viewpoint image for live broadcast, an information processing apparatus does not need to designate a time.

Other Variations

In the first embodiment, a case has been described in which a time for which the image generating apparatus 110 can generate a virtual viewpoint image is obtained by sequentially making inquiries retroactively from the current time. However, there is no limitation thereto, and a time for which a virtual viewpoint image can be generated may be obtained by making inquiries through binary search. For example, the inquiry intervals are controlled as 32 seconds, 16 seconds, 8 seconds, 4 seconds, . . . , 1 second, ½ seconds, ¼ seconds, ⅛ seconds, ¹⁄₁₆ seconds, and then ¹⁄₃₂ seconds. If generation is possible regarding 32 seconds, an inquiry as to whether or not generation is possible is then performed regarding 16 seconds. If generation is not possible regarding 16 seconds, inquiry is performed regarding 24 seconds acquired by adding 8 seconds to 16 seconds. If generation is possible regarding 24 seconds, inquiry is performed regarding 20 seconds acquired by subtracting 4 seconds from 24 seconds. Repeating this and thereby gradually obtaining a time for which generation is possible is effective. An advantage of this method is that a time for which generation is possible can be reliably obtained through a certain number of inquiries.

In the first to fourth embodiments, a method for obtaining a time for which a virtual viewpoint image, mainly for live broadcast, can be generated has been described. A preparation time required to enter a state where a virtual viewpoint image can be generated, the preparation time being acquired when obtaining a time for which a virtual viewpoint image can be generated, can be used also when generating a virtual viewpoint image for replay. For example, the fact that it is not possible to generate a virtual viewpoint image corresponding to a time that is later than a time acquired by subtracting the preparation time from the current time can be used as a restriction when setting a replay time. A case is considered in which setting of a replay time is designated using a dial of an input device. By providing a mechanism that keeps a dial from being turned in a direction in which the above-described restriction is not met, it is possible to prevent erroneous setting of a replay time.

In the first to fourth embodiments, cases have been described in which the image generating apparatus 110 and the information processing apparatus 10 are configured as independent apparatuses, but there is no limitation thereto. For example, the image generating apparatus 110 and the information processing apparatus 10 may be configured as an information processing apparatus that has a virtual viewpoint image generation processing unit.

In addition, in the first to fourth embodiments, cases have been described in which the information processing apparatus 10 outputs a virtual viewpoint, but there is no limitation thereto, and the information processing apparatus 10 does not need to have a function for outputting a virtual viewpoint. For example, the information processing apparatus 10 may be configured as an information processing apparatus that obtains a time for which a virtual viewpoint image can be generated. In that case, a time for which a virtual viewpoint image can be generated is transmitted to another information processing apparatus that outputs a virtual viewpoint or the image generating apparatus 110.

In the first to fourth embodiments, cases have been described in which the frame rate of a virtual viewpoint image is 60 fps, but there is no limitation thereto, and any frame rate may be used. For example, the frame rate may be 30 fps, and any frame rate such as 59.94 fps or the like may be used.

As described above, according to the above embodiments, an information processing apparatus that can be aware of a time required for generating a virtual viewpoint image is provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-056748, filed Mar. 23, 2018, which is hereby incorporated by reference herein in its entirety.

What is claimed is:

1. An information processing apparatus configured to communicate with an image generating apparatus that generates a virtual viewpoint image that is based on a plurality of images acquired by image capturing with a plurality of cameras from a plurality of directions, the information processing apparatus comprising:
 a transmission unit configured to transmit an inquiry to the image generating apparatus that is obtaining a data set for generating a virtual viewpoint image;
 an obtaining unit configured to obtain time information regarding a time corresponding to a virtual viewpoint image that can be generated by the image generating apparatus, based on a response to the inquiry transmitted by the transmission unit; and an output unit configured to output, to the image generating apparatus, a generation instruction to generate a virtual viewpoint image corresponding to a time determined based on the time information obtained by the obtaining unit.

2. The information processing apparatus according to claim 1, wherein the output unit outputs, to the image generating apparatus, viewpoint information indicating a position and direction of a virtual viewpoint corresponding to the time determined based on the time information obtained by the obtaining unit.

3. The information processing apparatus according to claim 1, further comprising:

a determination unit configured to determine a time difference between a current time and a time corresponding to a virtual viewpoint image to be generated, based on the time information obtained by the obtaining unit, wherein the output unit outputs a generation instruction to generate a virtual viewpoint image corresponding to a time determined based on the time difference determined by the determination unit.

4. The apparatus according to claim 1, wherein the transmission unit transmits the inquiry that indicates a time for inquiry, to the image generating apparatus, and the obtaining unit obtains the time information based on reception, from the image generating apparatus, of a response indicating that a virtual viewpoint image corresponding to the time for inquiry indicated in the inquiry transmitted by the transmission unit can be generated.

5. The apparatus according to claim 4, wherein the obtaining unit transmits the inquiry that indicates a time for inquiry determined based on a current time.

6. The apparatus according to claim 5, wherein the transmission unit transmits a first inquiry that indicates, as a time for inquiry, a time that is earlier than a current time by a first time length, and in a case where a response indicating that a virtual viewpoint image corresponding to the time for inquiry indicated by the first inquiry cannot be generated is received from the image generating apparatus, the transmission unit transmits a second inquiry that indicates, as a time for inquiry, a time that is earlier than a current time by a second time length, the second time length being longer than the first time length.

7. The apparatus according to claim 6, wherein a difference between the second time length and the first time length is a length that is based on a frame interval of a virtual viewpoint image that is generated by the image generating apparatus.

8. The apparatus according to claim 6, wherein, in a case where a response indicating that a virtual viewpoint image corresponding to the time for inquiry indicated by the second inquiry can be generated is received from the image generating apparatus, the obtaining unit obtains information indicating the second time length, as the time information.

9. The apparatus according to claim 4, further comprising:

an acceptance unit configured to accept an operation for designation of a time by a user or designation of a time length from a current time, wherein the transmission unit transmits, to the image generating apparatus, an inquiry indicating a time for inquiry determined based on the operation accepted by the acceptance unit.

10. The apparatus according to claim 9, further comprising:

a display control unit configured to display an image indicating whether or not a virtual viewpoint image corresponding to a time that is specified in accordance with the operation accepted by the acceptance unit can be generated, on a display unit based on a response received from the image generating apparatus.

11. The apparatus according to claim 1, wherein the obtaining unit obtains the time information based on reception, from the image generating apparatus, of a response indicating a time corresponding to a data set obtained by the image generating apparatus.

12. The apparatus according to claim 1, wherein the data set includes image data generated based on the plurality of images and model data.

13. The apparatus according to claim 1, further comprising:

a switching unit configured to switch between a mode in which time designation is included in a generation instruction that is output to the image generating apparatus by the output unit and a mode in which time designation is not included in the generation instruction.

14. A control method of an information processing apparatus configured to communicate with an image generating apparatus that generates a virtual viewpoint image that is based on a plurality of images acquired by image capturing with a plurality of cameras from a plurality of directions, the method comprising:

transmitting an inquiry to the image generating apparatus that is obtaining a data set for generating a virtual viewpoint image;

obtaining time information regarding a time corresponding to a virtual viewpoint image that can be generated by the image generating apparatus, based on a response to the transmitted inquiry; and outputting, to the image generating apparatus, an instruction to generate a virtual viewpoint image corresponding to a time determined based on the obtained time information.

15. The control method according to claim 14, further comprising:

outputting, to the image generating apparatus, viewpoint information indicating a position and direction of a virtual viewpoint corresponding to the time determined based on the obtained time information.

16. The control method according to claim 14, wherein the inquiry that is transmitted to the image generating apparatus indicates a time for inquiry, and the time information is obtained based on reception, from the image generating apparatus, of a response indicating that a virtual viewpoint image corresponding to the time for inquiry indicated by the transmitted inquiry can be generated.

17. A non-transitory computer-readable storage medium that stores a program for causing a computer that communicates with an image generating apparatus, which generates a virtual viewpoint image that is based on a plurality of images acquired by image capturing with a plurality of cameras from a plurality of directions, to execute a control method comprising:

transmitting an inquiry to the image generating apparatus that is obtaining a data set for generating a virtual viewpoint image;

obtaining time information regarding a time corresponding to a virtual viewpoint image that can be generated by the image generating apparatus, based on a response to the transmitted inquiry; and outputting, to the image generating apparatus, an instruction to generate a virtual viewpoint image corresponding to a time determined based on the obtained time information.

* * * * *